(12) United States Patent
Wiegel et al.

(10) Patent No.: US 8,826,963 B2
(45) Date of Patent: Sep. 9, 2014

(54) SAFETY BARRIER SYSTEMS FOR LOADING DOCKS

(75) Inventors: Aaron J. Wiegel, Benton, WI (US);
Donald P. Grant, Dubuque, IA (US);
Jason Dondlinger, Bellevue, IA (US);
Joseph Korman, Jr., Dubuque, IA (US);
Ronald P. Snyder, Dubuque, IA (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 34 days.

(21) Appl. No.: 13/461,409

(22) Filed: May 1, 2012

(65) Prior Publication Data
US 2013/0291455 A1 Nov. 7, 2013

(51) Int. Cl.
*A47G 5/00* (2006.01)

(52) U.S. Cl.
USPC ........ 160/29; 52/173.1; 52/745.05; 160/23.1; 160/242

(58) Field of Classification Search
USPC .......... 52/173.1, 173.2, 745.05; 160/23.1, 26, 160/29, 30, 238, 239, 242
See application file for complete search history.

(56) References Cited

U.S. PATENT DOCUMENTS

| | | |
|---|---|---|
| 3,803,943 A | 4/1974 | Woloszyk |
| 4,849,735 A | 7/1989 | Kirtley et al. |
| 5,078,197 A | 1/1992 | Weishar |
| 5,271,183 A | 12/1993 | Hahn et al. |
| 5,649,396 A | 7/1997 | Carr |
| 6,312,214 B1 | 11/2001 | Nowak et al. |
| 6,431,819 B1 | 8/2002 | Hahn |
| 6,575,435 B1 | 6/2003 | Kotzen |
| 6,634,139 B1 | 10/2003 | Metz |
| 6,880,301 B2 | 4/2005 | Hahn et al. |
| 7,032,267 B2 | 4/2006 | Mitchell et al. |
| 7,045,764 B2 | 5/2006 | Beggs et al. |
| 7,207,370 B2 | 4/2007 | Snyder et al. |
| 7,337,822 B2 | 3/2008 | Snyder et al. |
| 7,380,375 B2 | 6/2008 | Maly |
| 7,841,823 B2 | 11/2010 | Sveum et al. |
| 8,087,443 B2 | 1/2012 | Snyder et al. |
| 2002/0190849 A1 | 12/2002 | Orzechowski et al. |
| 2005/0102041 A1 | 5/2005 | Duvernell et al. |
| 2006/0137261 A1 | 6/2006 | Maly |
| 2008/0124203 A1 | 5/2008 | McDonald |
| 2010/0146719 A1 | 6/2010 | Swessel et al. |

OTHER PUBLICATIONS

European Search Report, issued by the European Patent Office in connection with European Patent Application No. 13002318.7, on Jul. 19, 2013, 8 pages.

*Primary Examiner* — William Gilbert
(74) *Attorney, Agent, or Firm* — Hanley, Flight & Zimmerman, LLC

(57) ABSTRACT

Example safety barrier systems for vehicle loading docks comprise a retractable flexible barrier with a special powered latching mechanism that locks the barrier in place and prevents it from being retracted under certain hazardous dock conditions. In some examples, the barrier cannot be retracted when there is no vehicle at the dock while the dock's door is open. In some examples, an alarm is energized when concurrently the door is open, the barrier is retracted and there is no vehicle at the dock.

34 Claims, 17 Drawing Sheets

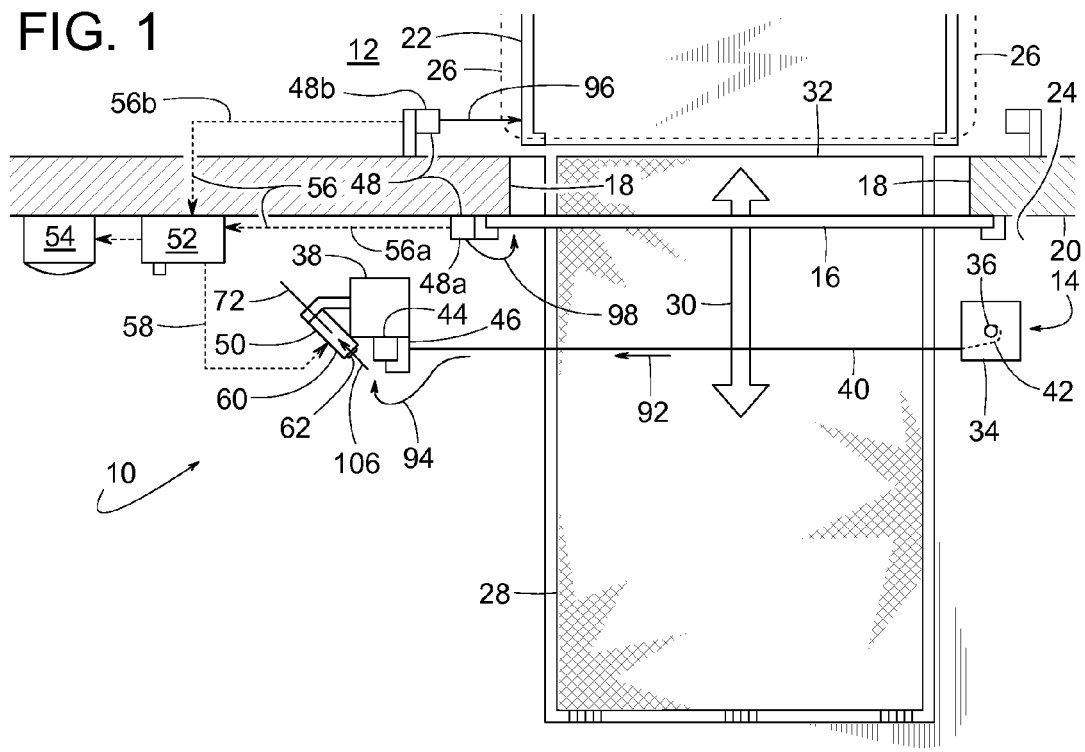

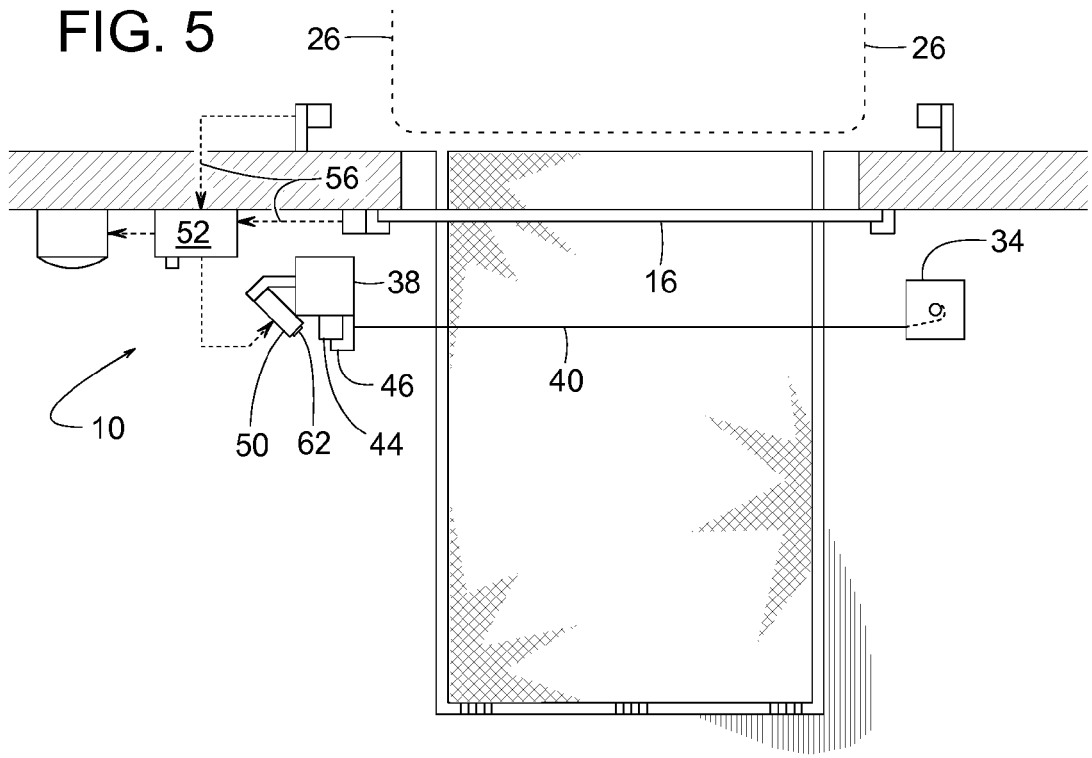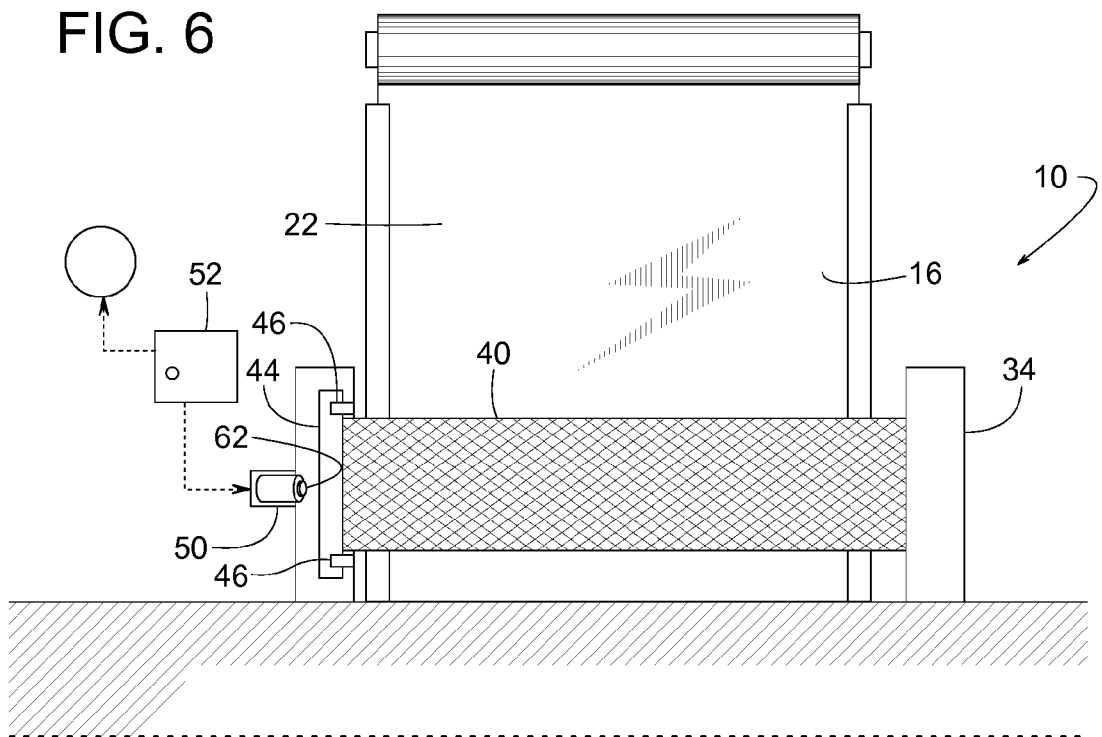

FIG. 21
FIG. 22
FIG. 23
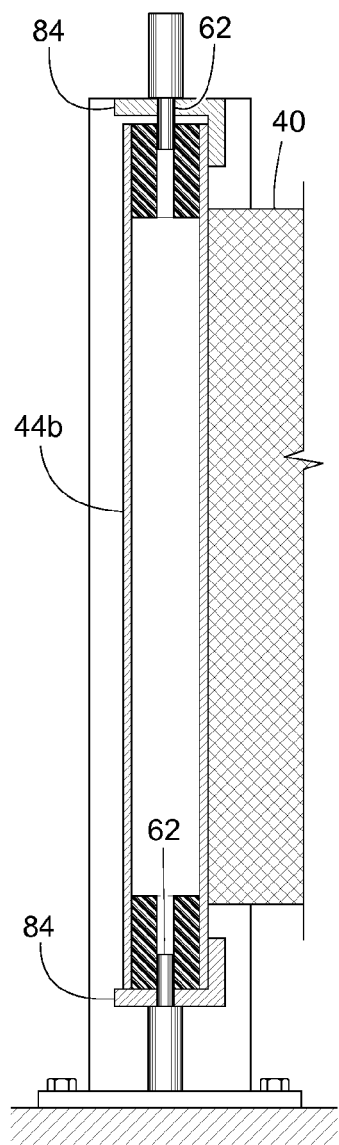
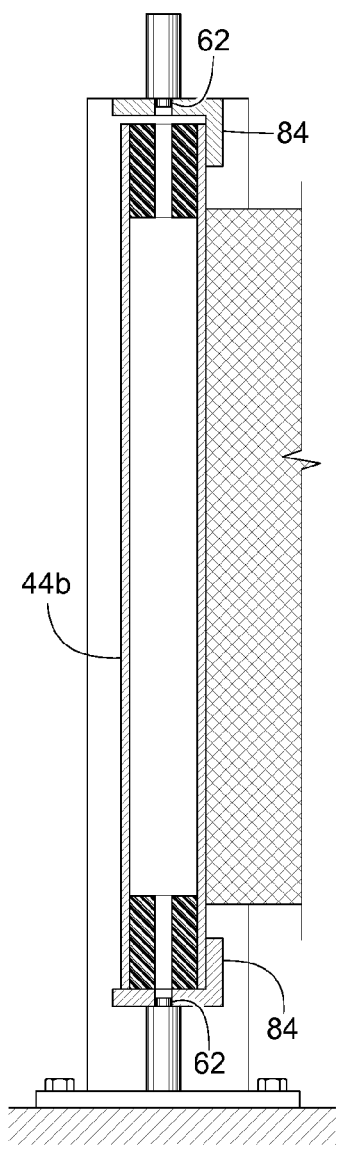
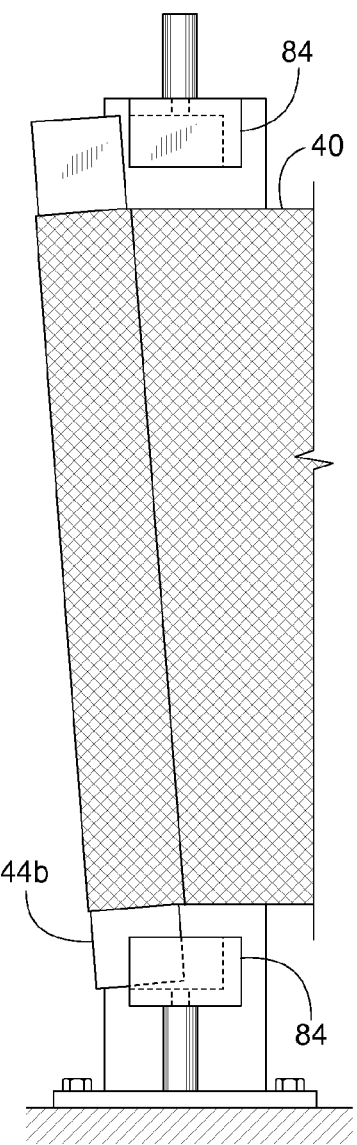

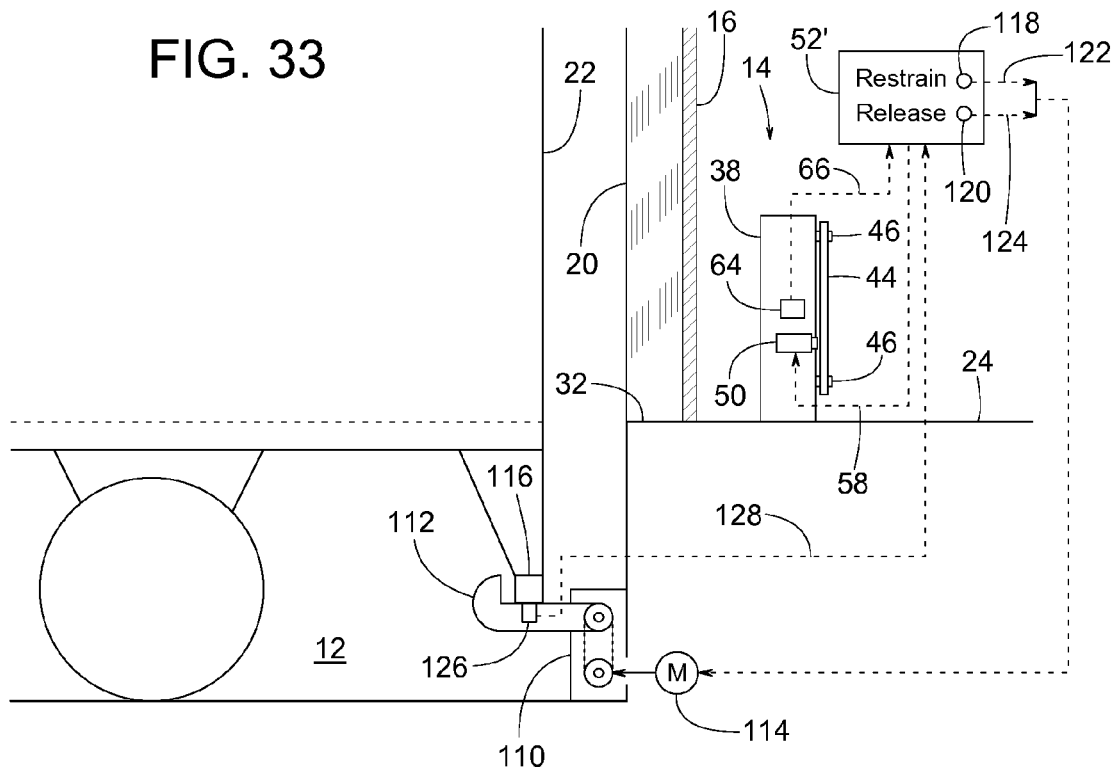
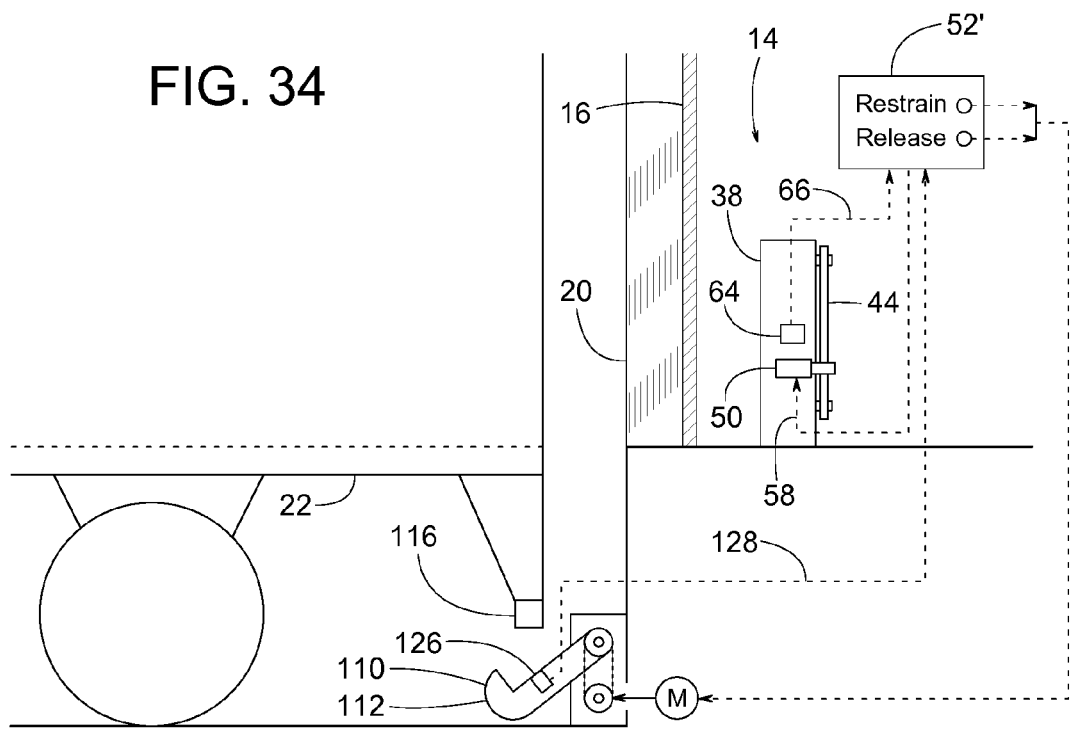

SAFETY BARRIER SYSTEMS FOR LOADING DOCKS

FIELD OF THE DISCLOSURE

This patent generally pertains to truck loading docks and more specifically to safety barriers at such docks.

BACKGROUND

Truck loading docks along an exterior wall of a building typically comprise a doorway by an elevated platform so that when a truck or trailer backs up to the doorway, the cargo-supporting bed of the truck is approximately flush with the platform. Many loading dock platforms have a dock leveler with a vertically adjustable front edge to compensate for moderate height differences between the platform and the truck bed as well as provide a bridge-like path between the platform and the truck. Some loading docks also include a vehicle restraint that helps hold the truck at the dock while cargo is being transferred to and from the truck. For safety, loading docks might also include some type of retractable barrier that can extend across the doorway. Examples of such dock levelers, vehicle restraints and/or retractable barriers are described in U.S. Pat. Nos. 8,087,443; 7,380,375; 7,337,822; 7,207,370; 7,032,267; 6,880,301; 7,841,823 and 6,431,819, all of which are hereby incorporated herein by reference in their entireties.

BRIEF DESCRIPTION OF THE DRAWINGS

FIG. 1 is a cross-sectional view taken along line 1-1 of FIG. 2 showing an example safety system for a loading dock.

FIG. 2 is a front view of the safety system shown in FIG. 1.

FIG. 5 is a cross-sectional top view similar to FIG. 1 but showing another operating condition of the dock.

FIG. 6 is a front view of FIG. 5.

FIG. 21 is a cross-sectional front view of another example distal end member and another example powered latching mechanism in a lock state.

FIG. 22 is a cross-sectional front view similar to FIG. 21 but showing the powered latching mechanism in an unlock state.

FIG. 23 is a front view similar to FIG. 22 but showing the distal end member being moved out from within two retainers.

FIG. 33 is a side schematic view showing an example safety system with a vehicle restraint in a restrain position.

FIG. 34 is a side schematic view similar to FIG. 33 but showing the vehicle restraint in a release position.

DETAILED DESCRIPTION

Figure 3:
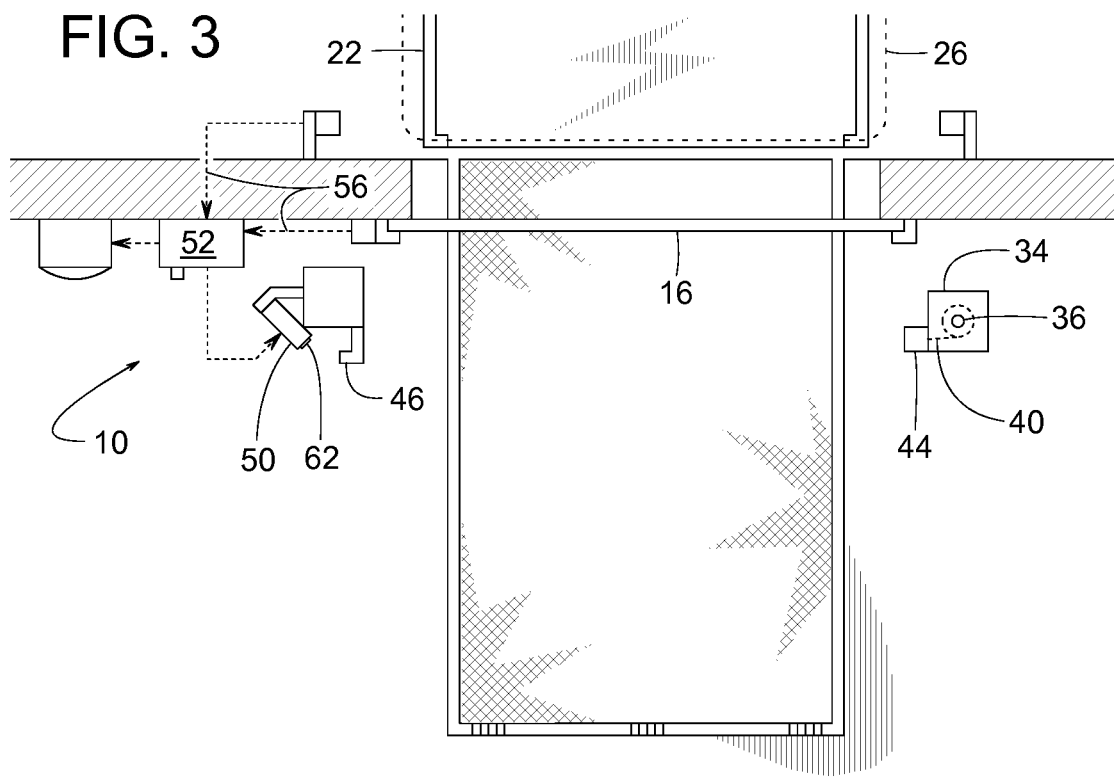
FIG. 3 is a cross-sectional top view similar to FIG. 1 but showing another operating condition of the dock.

FIGS. 1-16 show a loading dock 12 with an example safety system 10 that selectively locks and unlocks a retractable barrier apparatus 14 based on the condition of an adjacent door 16 at a doorway 18 of a wall 20 and/or the presence of a vehicle 22 at dock 12. To facilitate the transfer of cargo to and from the rear of vehicle 22, dock 12 has a platform 24 elevated above the vehicle's target parking spot 26 so that a cargo-supporting bed of vehicle 22 is approximately flush with platform 24. In some examples, a known dock leveler 28 compensates for moderate height differences between platform 24 and the vehicle's bed as well as provides a bridge-like path 30 from platform 24 to vehicle 22. Since platform 24 is appreciably higher than the driveway surface of parking spot 26, the locking of retractable barrier apparatus 14 with reference to door 16 and/or vehicle 22 can help prevent a front edge 32 of dock leveler 28 and/or platform 24 from becoming an exposed falling hazard.

Various structures and mechanisms can provide such a safety function. In the illustrated example, safety system 10 and related items comprise a first support member 34 with a rotatable take-up member 36, a second support member 38, a retractable flexible barrier 40 with an anchored end 42 attached to first support member 34 and a distal end member 44 (e.g., bar, pipe, rod, square tube, etc.) releasably connectable to second support member 38, a first retainer 46 and a second retainer 46. Support members 34 and 38 are schematically illustrated to represent any structure capable of supporting flexible barrier 40. Examples of support members 34 and 38 include, but are not limited to, posts, stanchions, wall surfaces and doorway frames. In some examples, support members 34 and 38 are stanchions solidly anchored to platform 24 in proximity with door 16.

Flexible barrier 40, which is supported by support members 34 and 38, is any blocking structure of sufficient flexibility to repeatedly extend and retract between support members 34 and 38. Examples of flexible barrier 40 include, but are not limited to, a sheet of material, one or more straps, one or more cables, a screen, and/or combinations thereof. To obstruct doorway 18, flexible barrier 40 is manually or otherwise extended over path 30, whereby flexible barrier 40 is in a deployed configuration, as shown in FIGS. 1 and 2. In the deployed configuration, distal end member 44 of flexible barrier 40 engages second support member 38. In some examples, second support member 38 has one or more retainers 46 of a shape suitable for releasably capturing distal end member 44.

Figure 4:
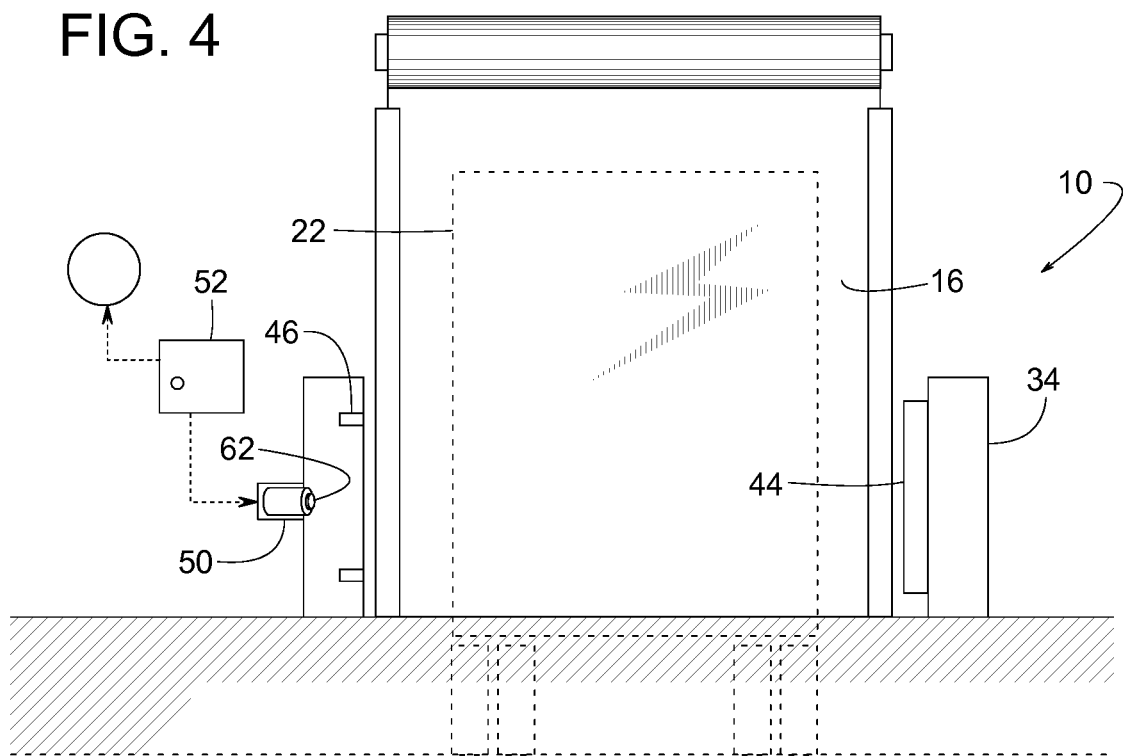
FIG. 4 is a front view of FIG. 3.

In the stored configuration, as shown in FIGS. 3 and 4, flexible barrier 40 is refracted to place distal end member 44 proximate first support member 34. In some examples, at least a portion of flexible barrier 40 wraps around rotatable take-up member 36 of first support member 34. In such examples, the rotational direction of take-up member 36 determines whether flexible barrier 40 extends or retracts. Various examples of rotatable member 36 are rotated by various means, examples of which include, but are not limited to, manual crank, electric motor, hydraulic motor, pneumatic motor, torsion spring, and/or combinations thereof. In the deployed configuration, some known releasable locking means holds flexible barrier 40 and/or rotatable member 36 fixed to first support member 34 to provide a relatively taut or fixed barrier that can resist at least some horizontal force pushing toward doorway 18. Examples of such known locking means include, but are not limited to, a ratchet, a worm gear, a brake, a clamp, a shot pin, etc.

In some cases, it may be desirable to prevent flexible barrier 40 from being moved from its deployed configuration (FIGS. 1 and 2) to its stored configuration (FIGS. 3 and 4). If door 16 is not fully closed and/or vehicle 22 is not at target parking spot 26, it might be beneficial to have some means for ensuring that flexible barrier 40 remains in its deployed configuration. To this end, some examples of safety system 10 include one or more of the following: a sensor instrument system 48 (one or more sensors), a powered latching mechanism 50, a controller 52 and an alarm 54 (audible and/or visible). In some examples, controller 52 or comparable circuit, wiring or wireless link places alarm 54 in communication with sensor instrument system 48.

In the example illustrated in FIGS. 1-16, sensor instrument system 48 comprises a door sensor 48a for determining whether door 16 is closed and a vehicle sensor 48b for determining whether vehicle 22 is at target parking spot 26. Thus, sensor instrument system 48, in this example, senses a location state of vehicle 22 and an open/closed state of door 16. Upon sensing the location state of vehicle 22 and the open/closed state of door 16, sensor instrument system 48 provides controller 52 with a dock condition status signal 56 (e.g., signal 56 comprising a door position signal 56a and a vehicle position signal 56b). In response to dock condition status signal 56, controller 52 provides an output signal 58 that controls the operation of powered latching mechanism 50, which, in turn, determines whether distal end member 44 can be released from second support member 38.

The structure and style of door 16, door sensor 48a, vehicle sensor 48b, controller 52 and powered latching mechanism 50 can vary from one example to another. Door 16 is schematically illustrated to represent any type of door, examples of which include, but are not limited to, a roll-up door, a vertically translating door, a laterally translating door, an articulated door and a pivotal door. Door sensor 48a is schematically illustrated to represent any means for sensing whether door 16 is closed. Examples of door sensor 48a include, but are not limited to, an electromechanical limit switch, a proximity switch, a Hall Effect sensor, an electric eye, a door drive unit with a current or pressure sensor, a camera, and an encoder. Vehicle sensor 48b is schematically illustrated to represent any means for sensing whether vehicle 22 is not at target parking spot 26. Examples of vehicle sensor 48b include, but are not limited to, an electromechanical switch, a proximity switch, a Hall Effect sensor, an electric eye, a camera, a vehicle restraint with vehicle detection, and/or a motion detector (passive or active).

Controller 52 is schematically illustrated to represent any electric circuit or wiring capable of appropriately controlling the operation of powered latching mechanism 50 in response to dock condition status signal 56. Examples of controller 52 include, but are not limited to, direct wiring connecting sensor instrument system 48 to a solenoid 60 of some examples of powered latching mechanism 50, an electromagnetic relay circuit, a PLC (programmable logic controller) and a microcontroller. Powered latching mechanism 50 is schematically illustrated to represent any means for selectively preventing distal end member 44 from being disconnected from second support member 38. Examples of powered latching mechanism 50 include, but are not limited to, a solenoid actuated plunger 62 (e.g., a solenoid actuating a rod, pin, cup, gate, lever, arm, cable, catch, clamp, etc.), a motor driven plunger, and/or a hydraulic or pneumatic actuated plunger.

FIGS. 1-16 show various example operating conditions of safety system 10 at loading dock 12. FIGS. 1 and 2 show vehicle 22 at target parking spot 26, door 16 closed and flexible barrier 40 in its deployed configuration. Retainers 46 are holding distal end member 44 to second support member 38; however, in response to dock condition status signal 56 indicating that vehicle 22 is at target parking spot 26 and door 16 is closed, controller 52 sends a signal to cause solenoid actuated plunger 62 to automatically retract to place powered actuating member 50 in an unlock state. In the unlock state, solenoid actuated plunger 62 does not present an obstruction to the removal of distal end member 44 from within retainers 46. Having the solenoid actuated plunger 62 in a retracted state enables distal end member 44 to be manually pulled away and disengaged from retainers 46 of second support member 38.

FIGS. 3 and 4 show vehicle 22 at target parking spot 26, door 16 closed and flexible barrier 40 in its stored configuration. In response to dock condition status signal 56 indicating that vehicle 22 is at target parking spot 26 and door 16 is closed, controller 52 sends a signal to cause solenoid actuated plunger 62 to automatically retract to place powered actuating member 50 in its unlock state.

FIGS. 5 and 6 show door 16 closed, flexible barrier 40 in its deployed configuration, but shows no vehicle at target parking spot 26. Retainers 46 are holding distal end member 44 to second support member 38; however, in response to dock condition status signal 56 indicating that door 16 is closed, controller 52 sends a signal to cause solenoid actuated plunger 62 to automatically retract to place powered actuating member 50 in its unlock state. In the unlock state, solenoid actuated plunger 62 does not present an obstruction to the removal of distal end 44 from within retainers 46. Having the solenoid actuated plunger 62 in a retracted state enables distal end 44 to be manually pulled away and disengaged from retainers 46 of second support member 38.

Figure 7:
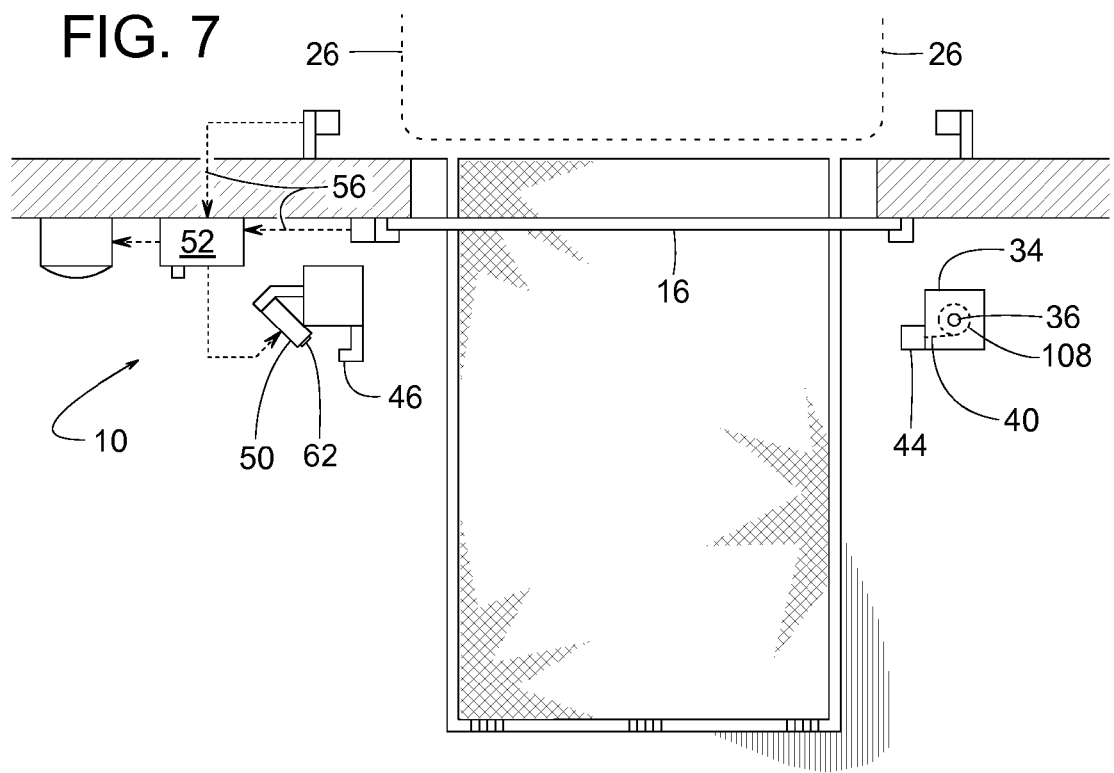
FIG. 7 is a cross-sectional top view similar to FIG. 1 but showing another operating condition of the dock.
Figure 8:
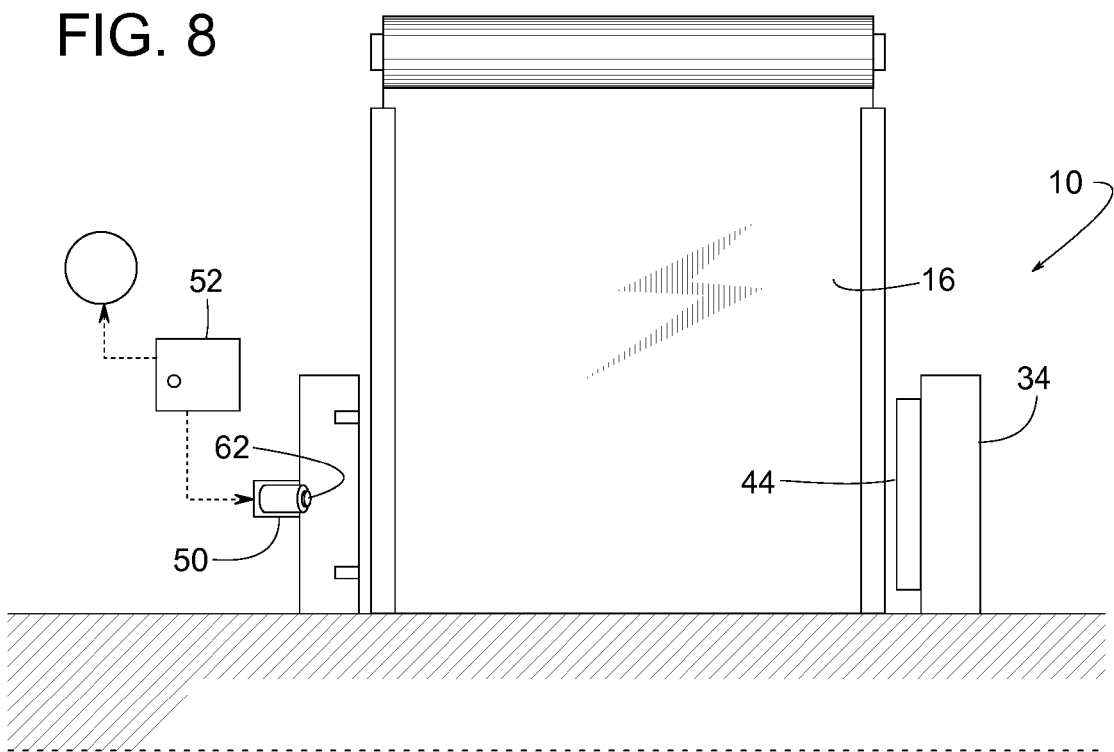
FIG. 8 is a front view of FIG. 7.

FIGS. 7 and 8 show door 16 closed, flexible barrier 40 in its stored configuration, and no vehicle at target parking spot 26. In response to dock condition status signal 56 indicating that door 16 is closed, controller 52 sends a signal to cause solenoid actuated plunger 62 to automatically retract to place powered actuating member 50 in its unlock state.

Figure 9:
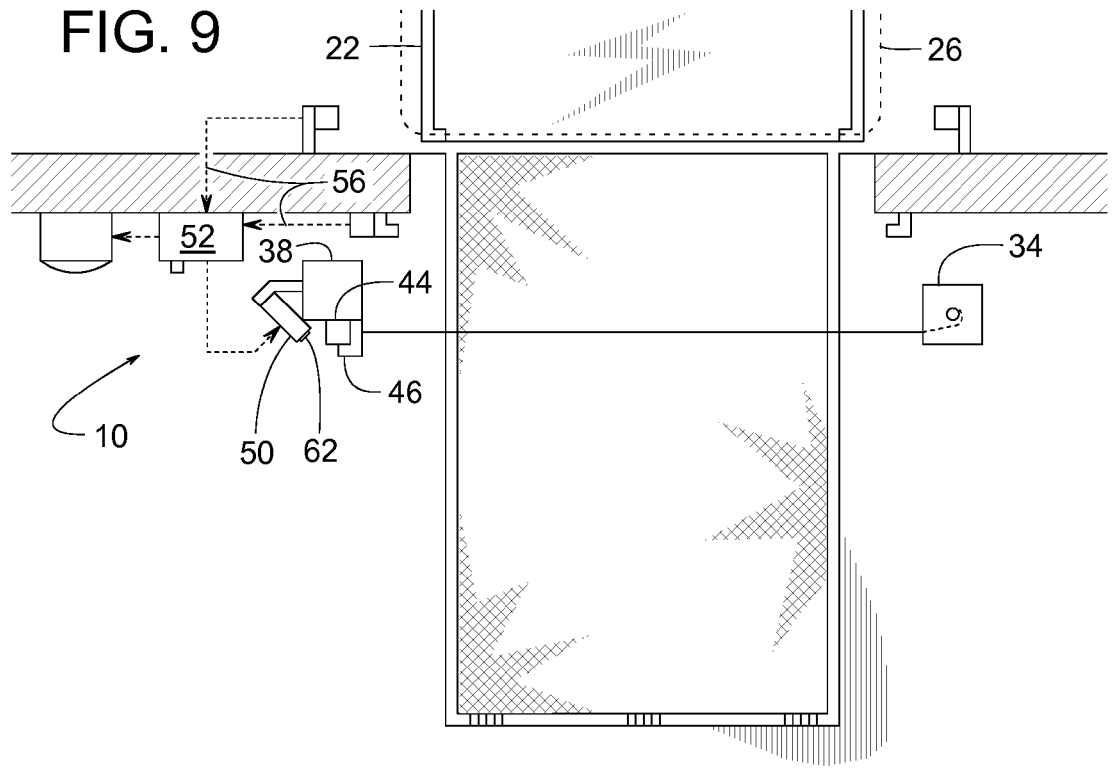
FIG. 9 is a cross-sectional top view similar to FIG. 1 but showing another operating condition of the dock.
Figure 10:
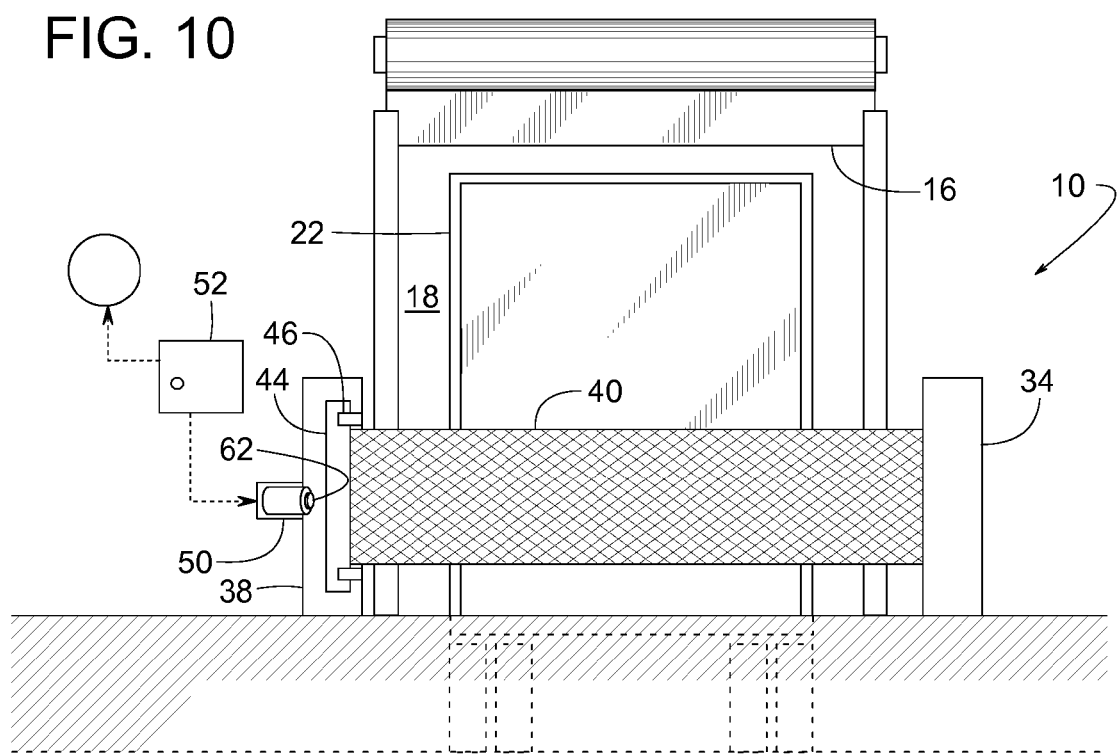
FIG. 10 is a front view of FIG. 9.

FIGS. 9 and 10 show door 16 open, vehicle 22 at target parking spot 26, and flexible barrier 40 in its deployed configuration. Retainers 46 are holding distal end member 44 to second support member 38; however, in response to dock condition status signal 56 indicating that vehicle 22 is at target parking spot 26, controller 52 sends a signal to cause solenoid actuated plunger 62 to automatically retract to place powered actuating member 50 in its unlock state. In the unlock state, solenoid actuated plunger 62 does not present an obstruction to the removal of distal end 44 from within retainers 46. Having the solenoid actuated plunger 62 in a retracted state enables distal end 44 to be manually pulled away and disengaged from retainers 46 of second support member 38.

Figure 11:
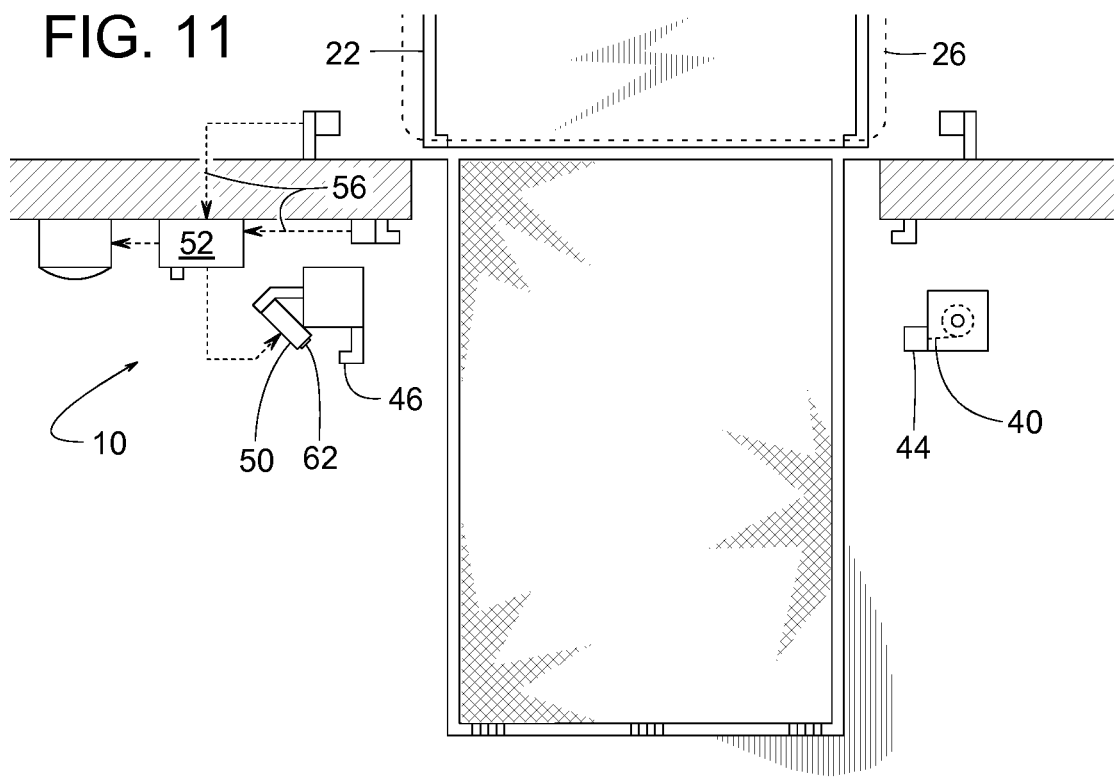
FIG. 11 is a cross-sectional top view similar to FIG. 1 but showing another operating condition of the dock.
Figure 12:
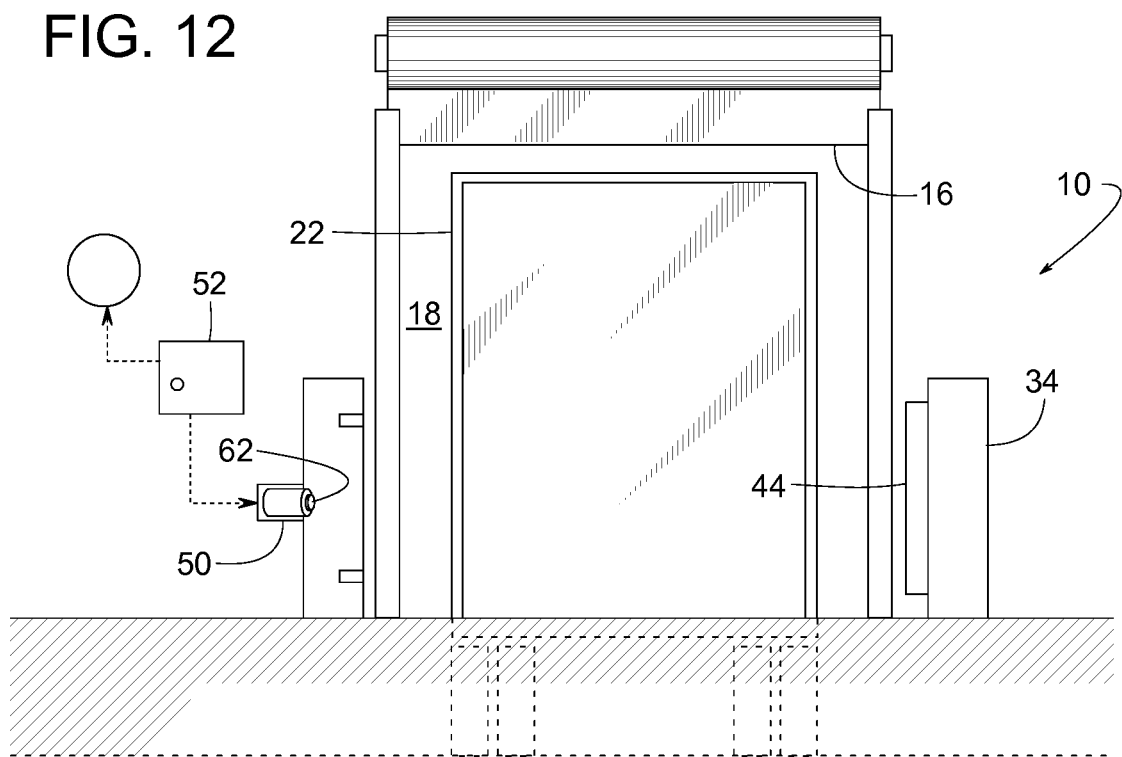
FIG. 12 is a front view of FIG. 11.

FIGS. 11 and 12 show door 16 open, vehicle 22 at target parking spot 26, and flexible barrier 40 in its stored configuration. In response to dock condition status signal 56 indicating that vehicle 22 is at target parking spot 26, controller 52 sends a signal to cause solenoid actuated plunger 62 to automatically retract to place powered actuating member 50 in its unlock state.

Figure 13:
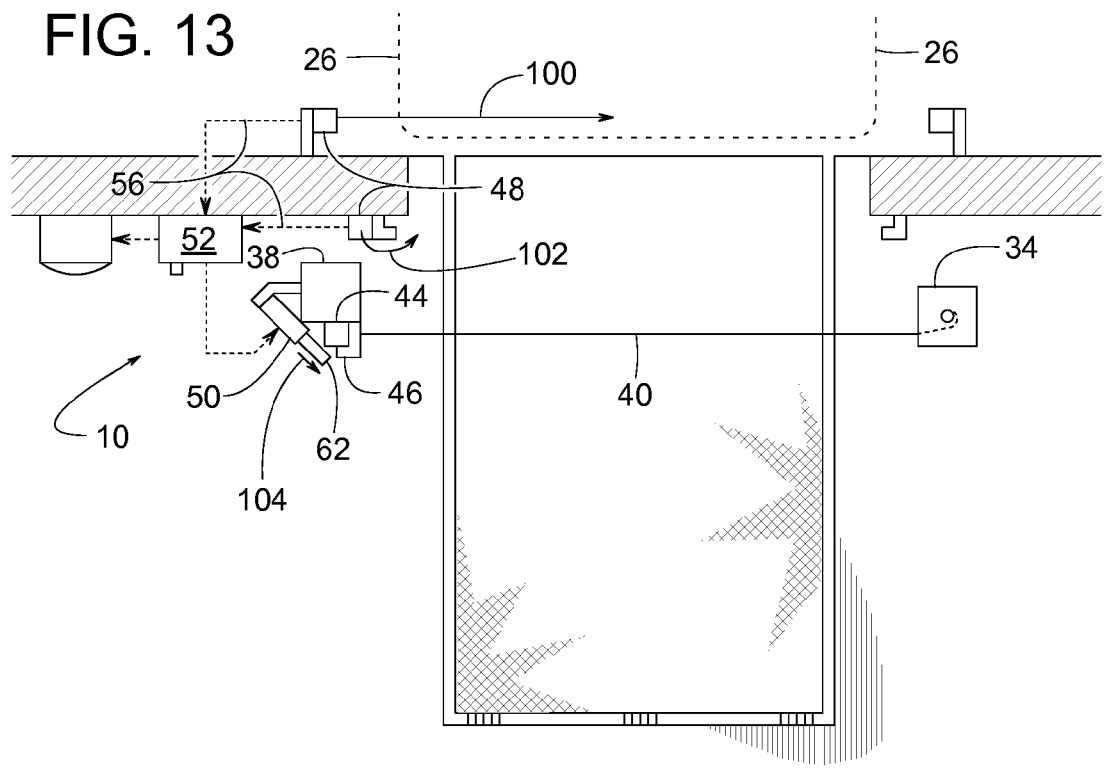
FIG. 13 is a cross-sectional top view similar to FIG. 1 but showing another operating condition of the dock.
Figure 14:
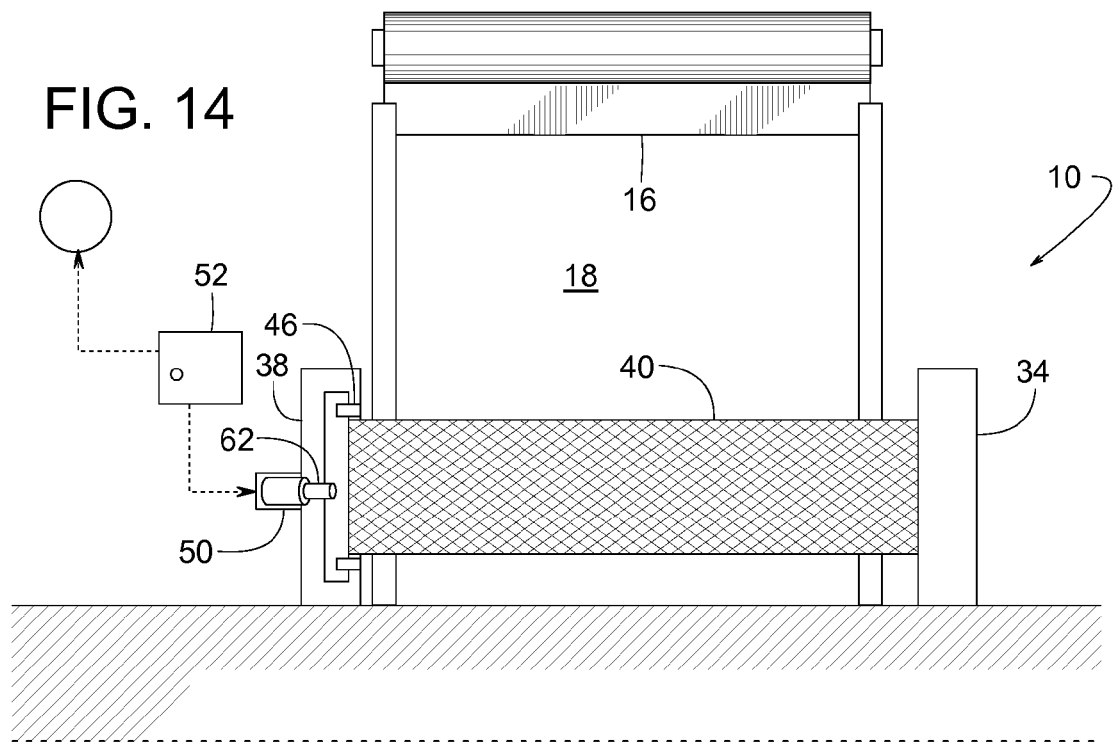
FIG. 14 is a front view of FIG. 13.

FIGS. 13 and 14 show door 16 open, no vehicle at target parking spot 26, and flexible barrier 40 in its deployed configuration. Retainers 46 are holding distal end member 44 to second support member 38. Also, in response to dock condition status signal 56 indicating that no vehicle is at target parking spot 26 and door 16 is not closed, controller 52 sends a signal to cause the solenoid actuated plunger 62 to automatically extend to place powered actuating member 50 in a lock state. In the lock state, solenoid actuated plunger 62 presents an obstruction to the removal of distal end 44 from within retainers 46. Having the solenoid actuated plunger 62 in an extended state prevents distal end 44 from being manually pulled away and disengaged from retainers 46 of second support member 38.

Figure 15:
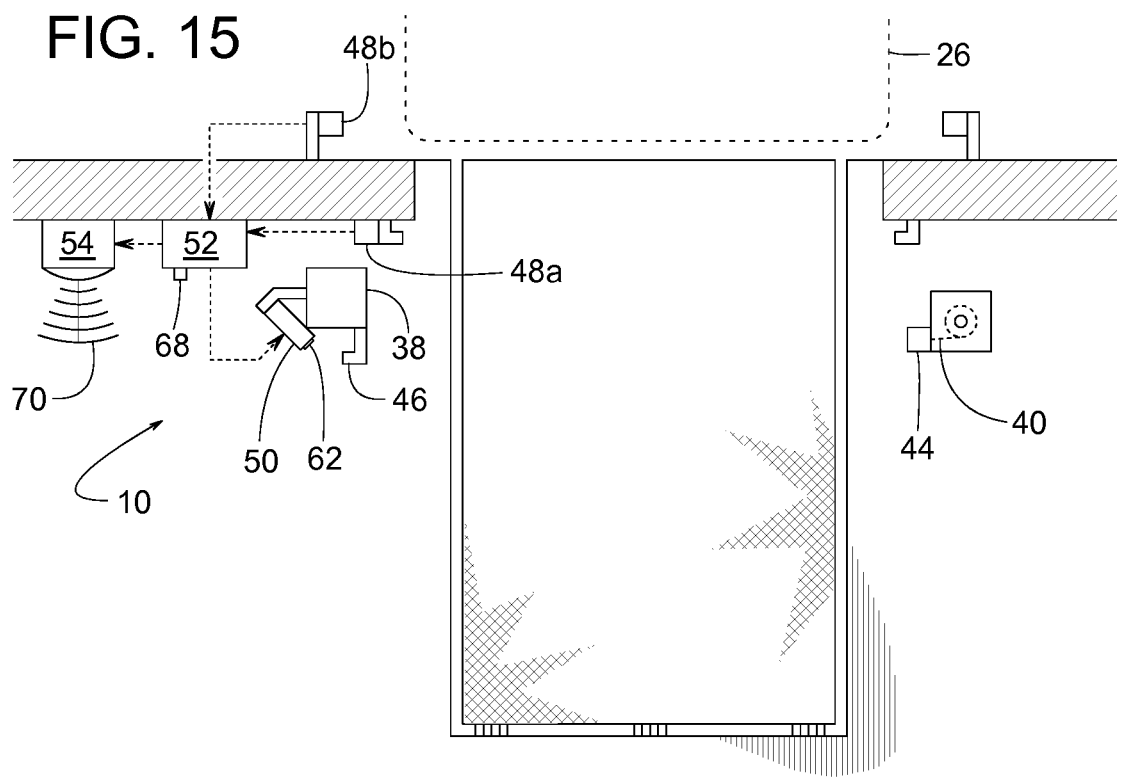
FIG. 15 is a cross-sectional top view similar to FIG. 1 but showing another operating condition of the dock.
Figure 16:
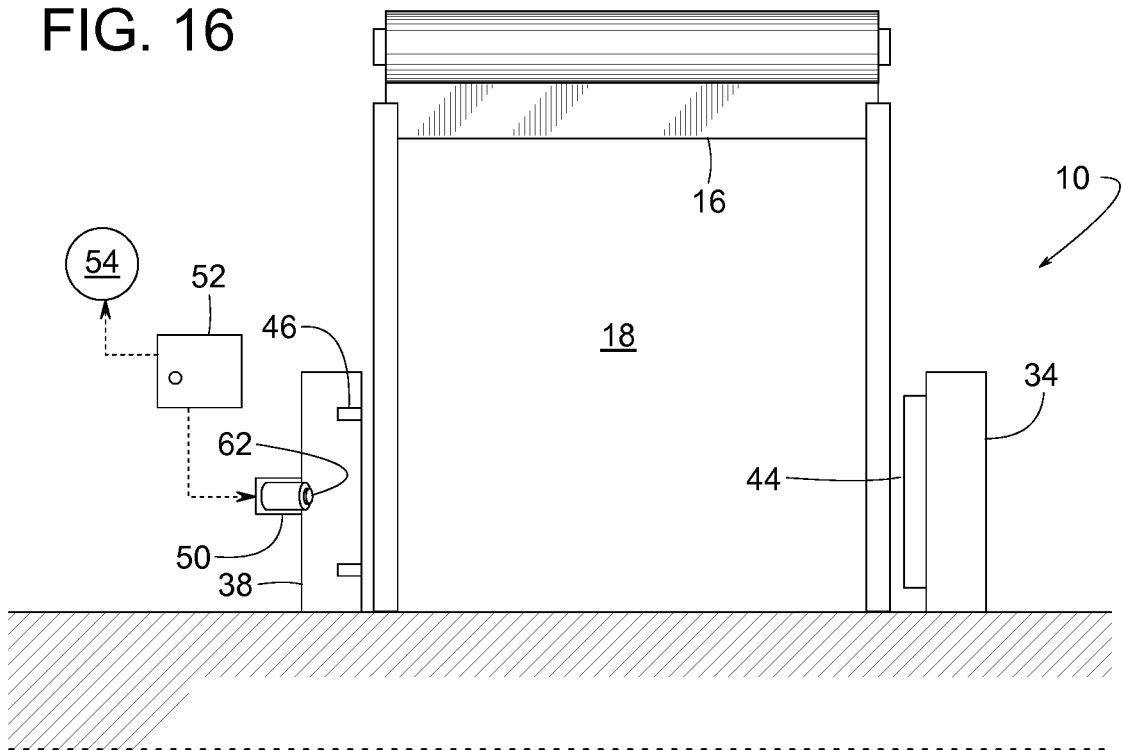
FIG. 16 is a front view of FIG. 15.

In some cases, as shown in FIGS. 15 and 16, door 16 might open and/or vehicle 22 departs target parking spot 26 at a time when flexible barrier 40 is in its stored position. To avoid such a situation, some examples of safety system 10 include interlock means that prevent door 16 from opening when no vehicle is present while flexible barrier 40 is in its stored position, wherein controller 52, in such examples, responds to a barrier sensor 64 (FIG. 17) that tells controller 52 via a barrier position signal 66 whether flexible barrier is in its stored or deployed configuration. Barrier sensor 64 is schematically illustrated to represent any means for determining whether flexible barrier 40 is in the deployed configuration. Examples of barrier sensor 64 include, but are not limited to, an electromechanical switch, a proximity switch, a Hall Effect sensor and an electric eye.

Additionally or alternatively, some examples of safety system 10 include a vehicle restraint that prevents vehicle 22 from departing if both door 16 is not closed and flexible barrier 40 is in its stored position. Additionally or alternatively, some examples of safety system 10 energizes alarm 54 (energized state) when a vehicle is not at target parking spot 26 at a time when both door 16 is not closed and flexible barrier 40 is in its stored position.

In some examples, when no vehicle is at target parking spot 26, door 16 is not closed and flexible barrier 40 is in its stored position, controller 52 sends a signal to cause solenoid actuated plunger 62 to automatically extend to place powered actuating member 50 in a lock state even though flexible barrier 40 is in its stored configuration. In such examples, controller 52 includes a switch 68 (e.g., a pushbutton) that moves powered actuator member 50 to the unlock state until barrier sensor 64 (FIG. 17) detects that flexible barrier 40 is in the deployed configuration. Once sensor 64 detects that flexible barrier 40 is in the deployed configuration, controller 52 responds by extending solenoid actuated plunger 62 to the lock state. In the lock state, solenoid actuated plunger 62 presents an obstruction to the removal of distal end 44 from within retainers 46 regardless of the state of switch 68. Because the controller 52 knows from barrier sensor 64 that the distal end 44 is now attached to the second support member 38, the controller 52 ignores switch 68.

Figure 17:
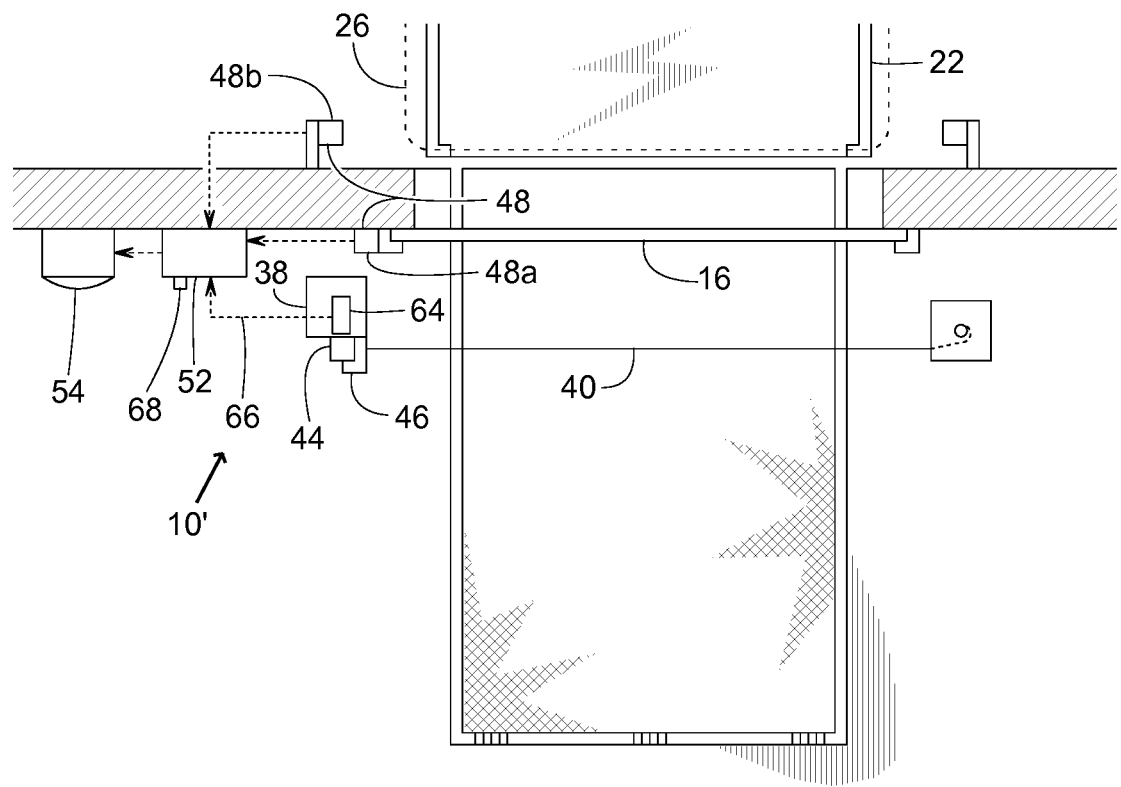
FIG. 17 is a cross-sectional top view similar to FIG. 1 but showing a barrier sensor added to the safety system.

In some examples, as shown in FIG. 17, a safety system 10' omits powered latching mechanism 50 and instead controller 52 commands alarm 54 to emit an alarm signal 70 (FIG. 15) when the following happen concurrently: vehicle sensor 48b senses no vehicle is at target parking spot 26, door sensor 48a senses that door 16 is not closed, and barrier sensor 64 determines that distal end member 44 is not engaged with second support member 38. Conversely, controller 52 de-energizes alarm 54 (de-energized state) if any one or more of the three occur, e.g., either sensor 48b senses vehicle 22 is at target parking spot 26, or door sensor 48a senses that door 16 is closed, or barrier sensor 64 determines that distal end member 44 is engaged with second support member 38.

While FIGS. 1-16 illustrate an example powered latching mechanism 50 that extends solenoid actuator plunger 62 in a traverse direction 72 that is angularly displaced out of parallel alignment with a lengthwise direction 74 of distal member 44, FIGS. 18-32 show other example powered latching mechanisms.

Figure 18:
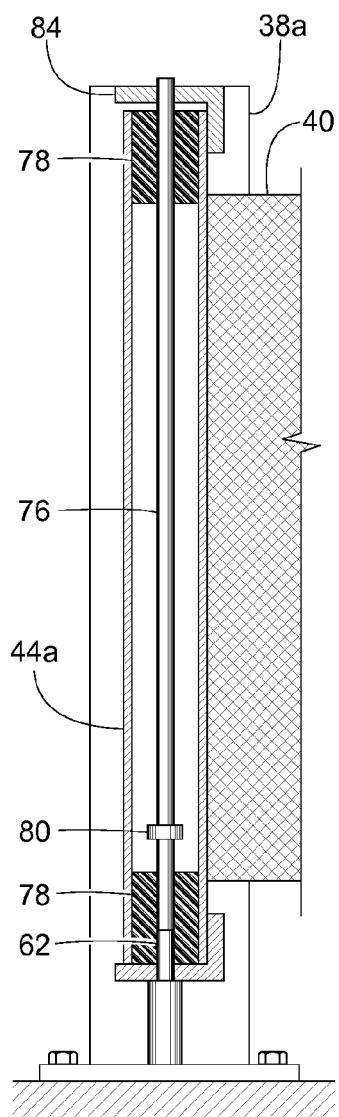
FIG. 18 is a cross-sectional front view of an example distal end member and an example powered latching mechanism in a lock state.
Figure 19:
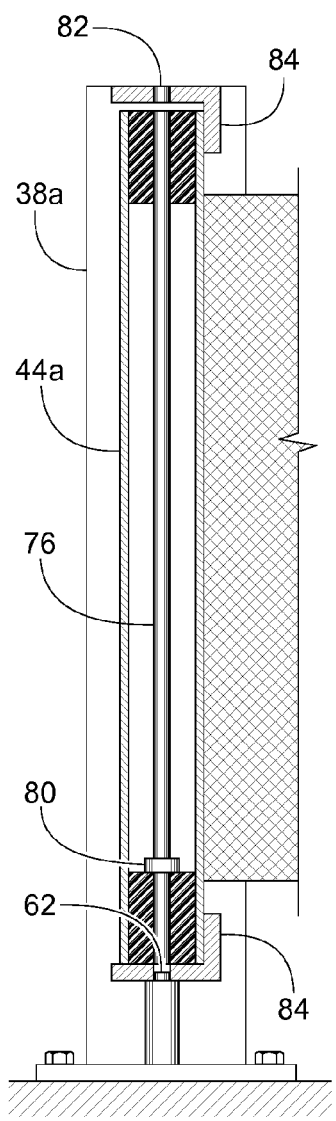
FIG. 19 is a cross-sectional front view similar to FIG. 18 but showing the powered latching mechanism in an unlock state.
Figure 20:
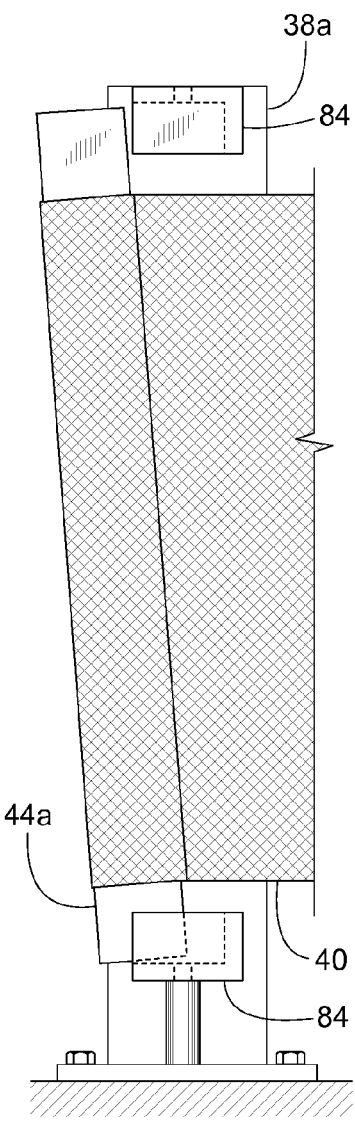
FIG. 20 is a front view similar to FIG. 19 but showing the distal end member being moved out from within two retainers.

FIGS. 18-20, for example, show a second support member 38a with solenoid actuated plunger 62. Plunger 62 selectively engages a distal end member 44a carrying an elongate member 76 that slides lengthwise along distal end member 44a. Two plastic bushings 78 guide the elongate member's sliding movement, and a collar 80 limits the elongate member's travel distance within distal end member 44a. FIG. 18 shows solenoid actuated plunger 62 extended to push elongate member 76 up through an opening 82 in an upper retainer 84. In the lock state, plunger 62 extends into lower bushing 78 and elongate member 76 protrudes up through opening 82, thereby locking upper and lower ends of distal end member 44a to second support member 38a. FIG. 19 shows solenoid actuated plunger 62 retracted (unlock state), which enables elongate member 76 to descend. In the unlock state, distal end member 44a can readily disengage upper and lower retainers 84, as shown in FIG. 20.

FIGS. 21-23 show a distal end member 44b, but instead of elongate member 76, two solenoid actuated plungers 62 extend to engage upper and lower ends of distal end member 44b, as shown in FIG. 21. To move from the lock state of FIG. 21 to the unlock state of FIG. 22, solenoid actuated plungers 62 retract out from within distal end member 44b. In the unlock state, distal end member 44b can readily disengage upper and lower retainers 84, as shown in FIG. 23.

Figure 24:
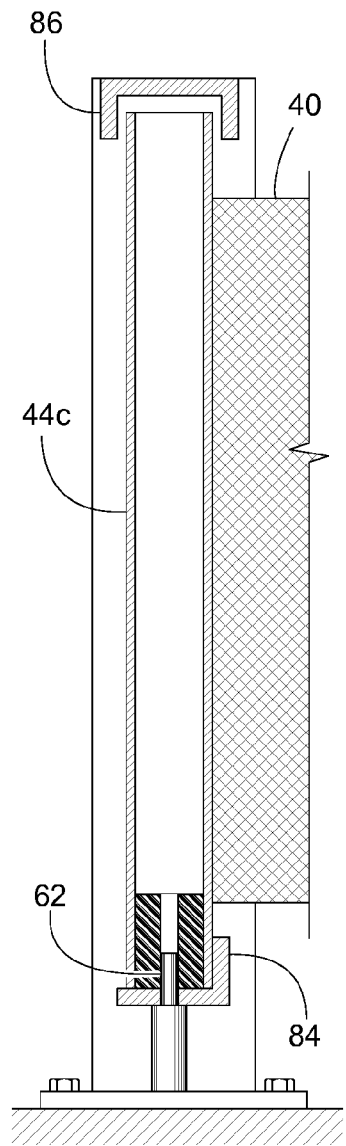
FIG. 24 is a cross-sectional front view of another example distal end member and another example powered latching mechanism in a lock state.
Figure 25:
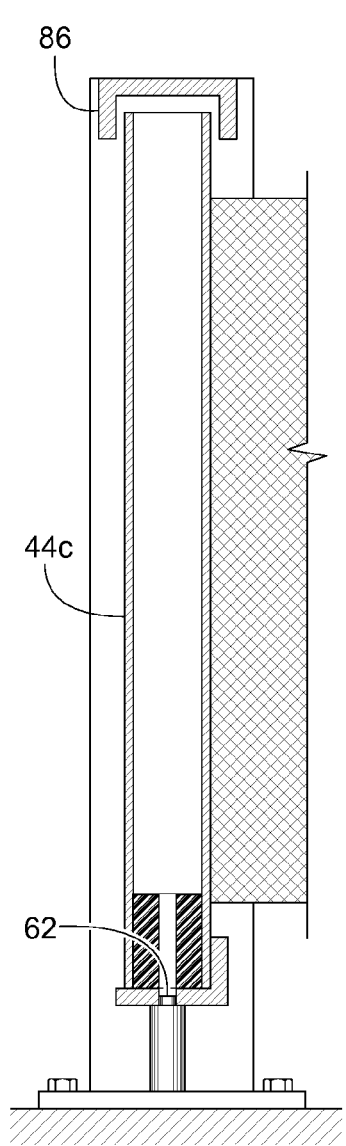
FIG. 25 is a cross-sectional front view similar to FIG. 24 but showing the powered latching mechanism in an unlock state.
Figure 26:
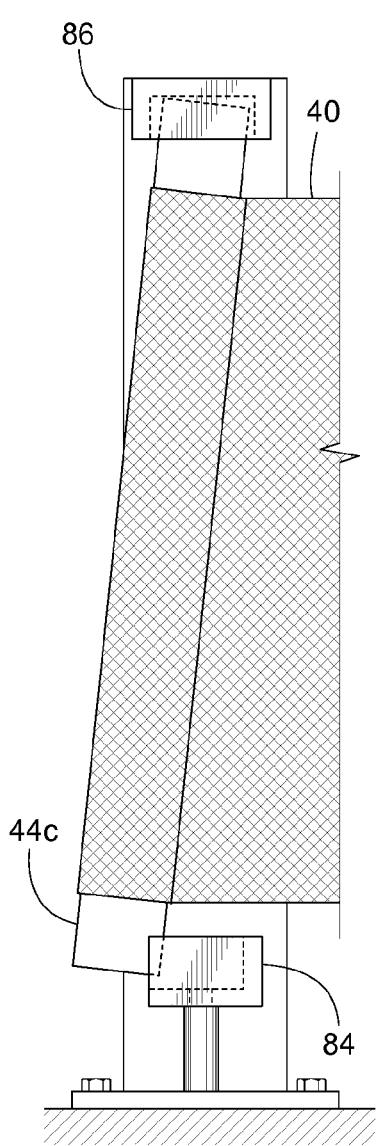
FIG. 26 is a front view similar to FIG. 25 but showing the distal end member being moved out from within two retainers.

FIGS. 24-26 show an example distal end member 44c, wherein solenoid actuated plunger 62 extends to engage one end of distal end member 44c, and a fixed or upper retainer 86 captures the other end of distal end member 44c, as shown in FIG. 24 (lock state). Upper retainer 86 is schematically illustrated to represent any structure for releasably capturing distal end member 48c. Examples of upper retainer 86 include, but are not limited to, an upper or lower cup engaging an exterior surface of distal end member 44c, and an upper or lower protrusion engaging an inner surface of distal end member 44c. To move from the lock state of FIG. 24 to the unlock state of FIG. 25, solenoid actuated plunger 62 retracts out from within distal end member 44c. In the unlock state, distal end member 44c can be readily tipped and disengaged from upper retainer 86 and lower retainer 84, as shown in FIG. 26.

Figure 27:
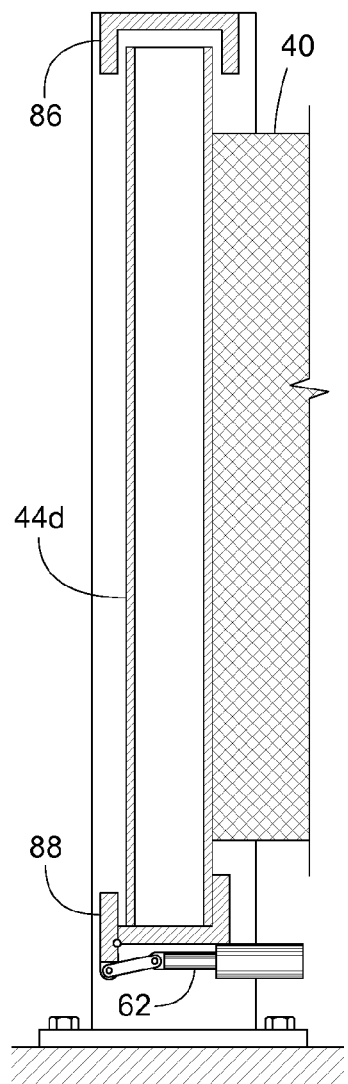
FIG. 27 is a cross-sectional front view of another example distal end member and another example powered latching mechanism in a lock state.
Figure 28:
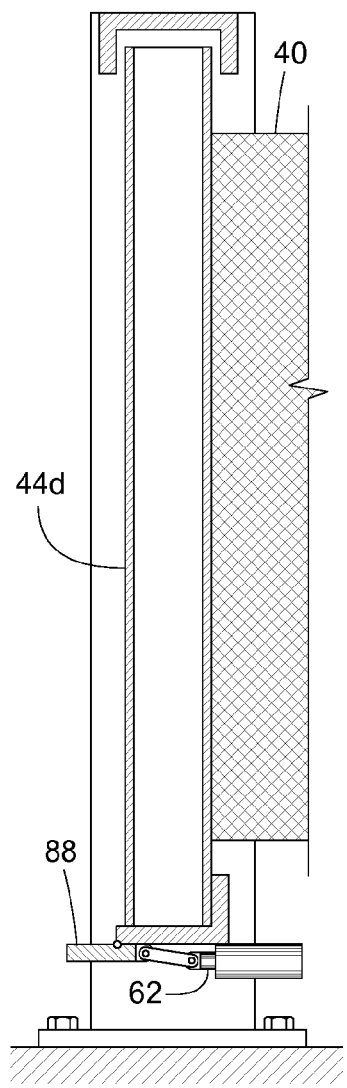
FIG. 28 is a cross-sectional front view similar to FIG. 27 but showing the powered latching mechanism in an unlock state.
Figure 29:
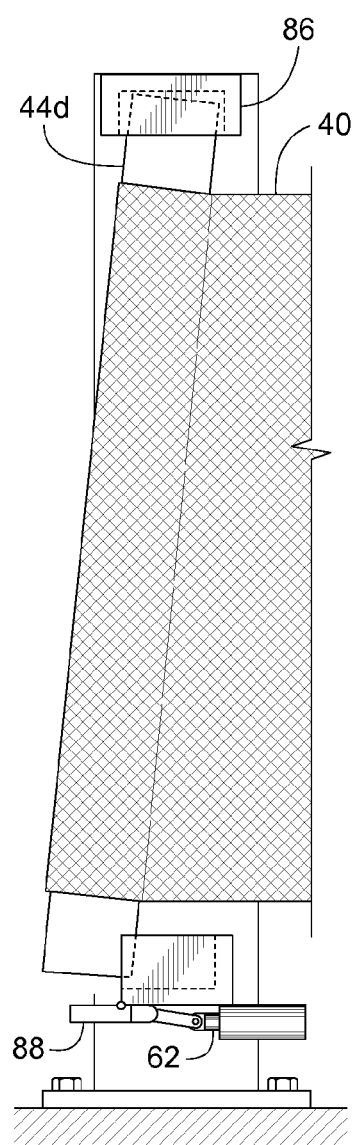
FIG. 29 is a front view similar to FIG. 28 but showing the distal end member being moved out from within two retainers.

FIGS. 27-29 show an example distal end member 44d, wherein solenoid actuated plunger 62 extends to move a pivotal lever 88 to a position where pivot lever 88 blocks one end of distal end member 44d, and upper retainer 86 captures the other end of distal end member 44d, as shown in FIG. 27 (lock state). To move from the lock state of FIG. 27 to the unlock state of FIG. 28, solenoid actuated plunger 62 retracts to pivot lever 88 clear of distal end member 44d. In the unlock state, distal end member 44d can be readily tipped and disengaged from upper retainer 86 and lower retainer 84, as shown in FIG. 29.

Figure 30:
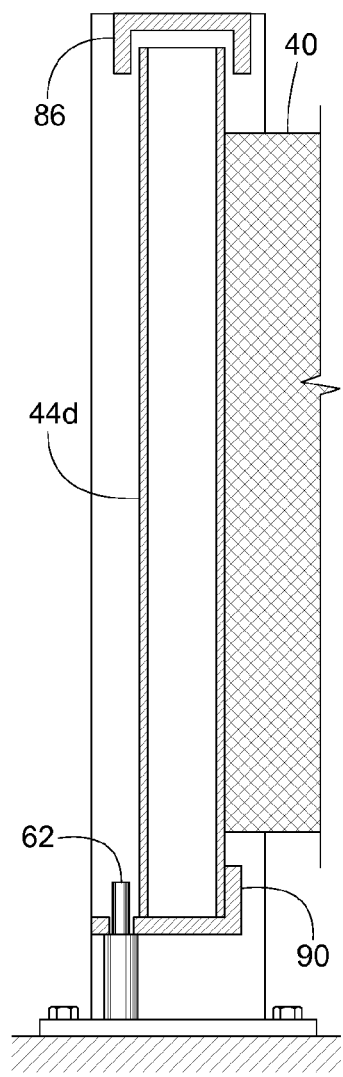
FIG. 30 is a cross-sectional front view of another example distal end member and another example powered latching mechanism in a lock state.
Figure 31:
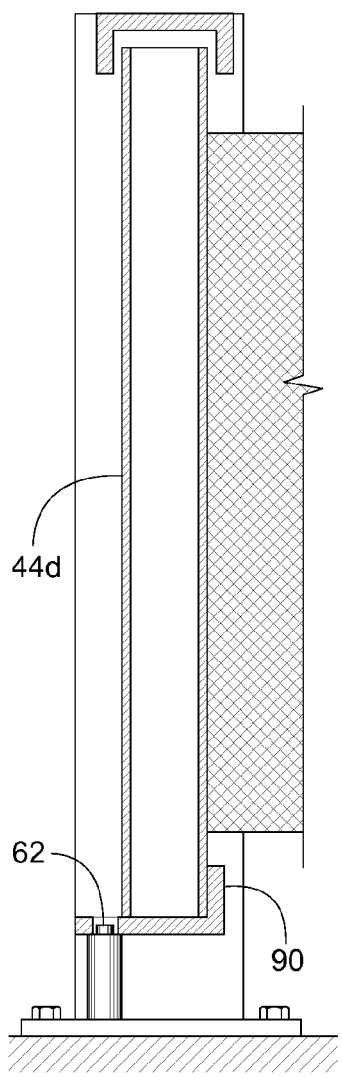
FIG. 31 is a cross-sectional front view similar to FIG. 30 but showing the powered latching mechanism in an unlock state.
Figure 32:
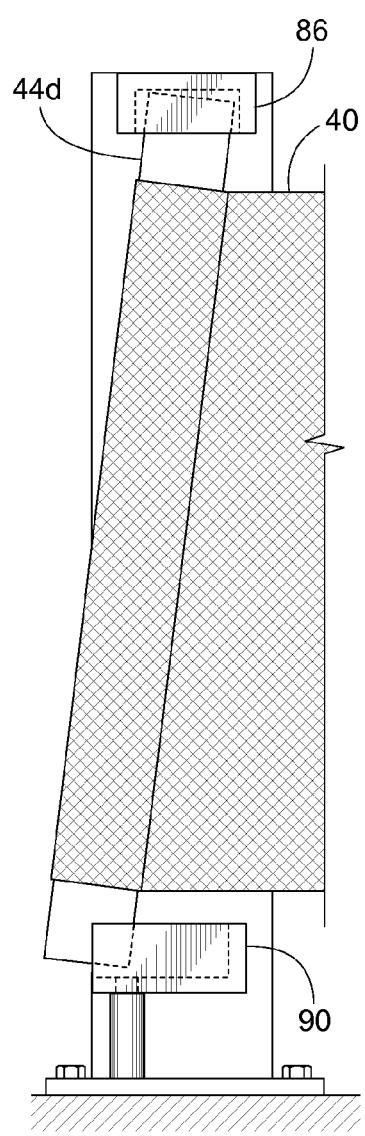
FIG. 32 is a front view similar to FIG. 31 but showing the distal end member being moved out from within two retainers.

FIGS. 30-32 show solenoid actuated plunger 62 capable of extending to obstruct one end of distal end member 44d while upper retainer 86 captures the other end of distal end member 44d, as shown in FIG. 30 (lock state). To move from the lock state of FIG. 30 to the unlock state of FIG. 31, solenoid actuated plunger 62 retracts clear of distal end member 44d. In the unlock state, distal end member 44d can be readily tipped and disengaged from upper retainer 86 and lower retainer 90, as shown in FIG. 32.

Referring to FIGS. 33 and 34, as an addition or alternative to the examples shown in FIGS. 1-32, the operation of a vehicle restraint 110 and retractable barrier apparatus 14 are interlocked. The intent is to have retractable barrier apparatus 14 be sufficiently strong to withstand the impact of a forklift and prevent it from accidentally driving over front edge 32 of platform 24 when there is no restrained vehicle at dock 12. Vehicle restraint 110 is schematically illustrated to represent any means for selectively inhibiting the departure of vehicle 22 from dock 12. For instance, some examples of vehicle restraint 110 include a hook 112 that a motor 114 drives between a restrain position (FIG. 33) and a release position (FIG. 34). In the restrain position, a rear impact guard 116 of vehicle 22 is engaged by hook 112, which presents an obstruction that limits forward movement of vehicle 22. In the release position, hook 112 is below rear impact guard 116, so vehicle 22 is free to depart. In some examples, a controller 52' includes pushbuttons 118 and 120 for initiating a lock signal 122 and a release signal 124 that command the movement of vehicle restraint 110 to its restrain and release positions, respectively.

Vehicle restraint 110, in some examples, includes a restraint sensor 126 for providing controller 52' with a vehicle restraint position signal 128 indicating whether vehicle restraint 110 is in the restrain or release position. Restraint sensor 126 is schematically illustrated to represent any means for determining whether vehicle 22 is restrained or released. Examples of restraint sensor 126 include, but are not limited to, an electromechanical switch, a motor current sensor, a proximity switch, a Hall Effect sensor and an electric eye.

With restraint sensor 126, in some examples, output signal 58 from controller 52' switches powered latching member 50 from its unlock state to its lock state in response to vehicle restraint position signal 128 indicating that vehicle restraint 110 is in the release position. As explained earlier, powered latching member 50 in the lock state while flexible barrier 40 is in the deployed configuration prevents distal end member 44 from disengaging second support member 38. Interlocking vehicle restraint 110 with powered latching member 50 in this manner prevents flexible barrier 40 from being moved to its stored configuration unless vehicle 22 is restrained at dock 12.

In addition or alternatively, in some examples, if barrier position signal 66 from barrier sensor 64 indicates that flexible barrier 40 is not in the deployed configuration, controller 52' inhibits release signal 124 from being conveyed to vehicle restraint 110 (e.g., its motor 114). This helps prevent vehicle 22 from departing dock 12 unless flexible barrier 40 is in the deployed configuration.

It should be noted that an arrow 92 of FIGS. 1 and 2 represents extending flexible barrier 40 from first support member 34 to second support member 38 such that flexible barrier 40 extends across doorway 18. An arrow 94 of FIG. 1 represents connecting distal end 44 of flexible barrier 40 to second support member 38. Arrows 96 and 98 of FIG. 1 represent sensor instrument system 48 sensing a first condition comprising at least one of the following: door 16 is closed or vehicle 22 is at target parking spot 26. Arrows 100 and 102 of FIG. 13 represent sensor instrument system 48 sensing a second condition comprising at least one of the following: door 16 is not closed or vehicle 22 is not at target parking spot 26.

An arrow 104 of FIG. 13 represents moving latching member 50 to a lock state in response to sensor instrument system 48 sensing the second condition. An arrow 106 of FIG. 1 represents moving latching member 50 to an unlock state in response to sensor instrument system 48 sensing the first condition. In the lock state, latching member 50 inhibiting distal end 44 from separating from the second support member 38 is illustrated in FIG. 13, which shows latching member 50 presenting an obstruction to distal end 44. In the unlock state, latching member 50 permitting and/or enabling distal end 44 from separating from second support member 38 is illustrated in FIG. 2, which shows latching member 50 being clear of distal end 44. Dashed line 108 of FIG. 7 represents wrapping at least a portion of flexible barrier 40 around rotatable take-up member 36, which is supported by first support member 34.

Figure 35:
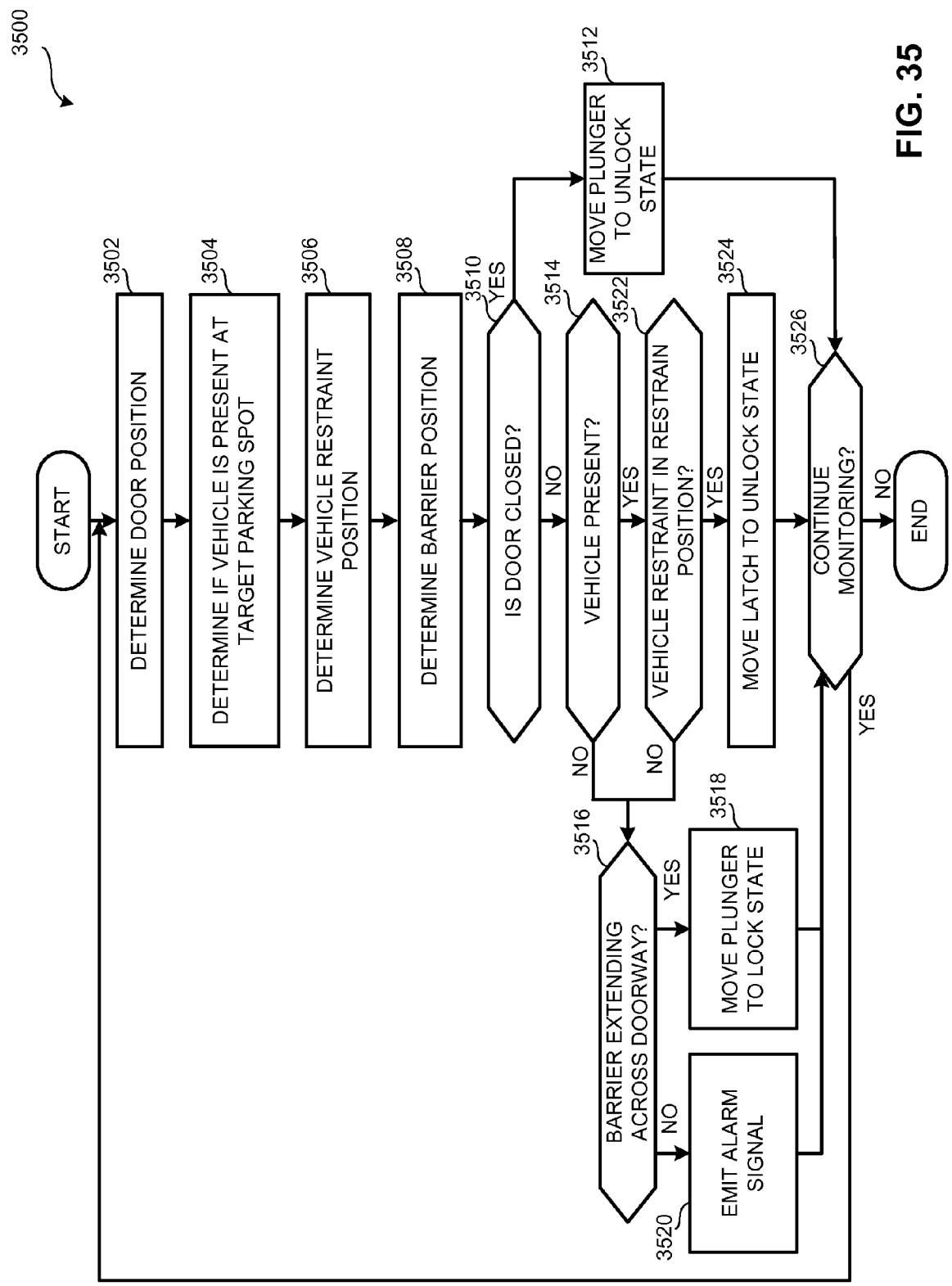
FIG. 35 is a flowchart representative of machine readable instructions that may be executed to implement the controllers of FIGS. 1, 2 and 34 to monitor and/or operate the examples disclosed herein.

A flowchart representative of example machine readable instructions for implementing the controller 52, 52' and/or the sensors 48, 48a, 48b, 64 and/or 126 of the examples disclosed herein is shown in FIG. 35. In this example, the machine readable instructions comprise a program for execution by a processor such as the processor 3612 shown in the example computer 3600 discussed below in connection with FIG. 36. The program may be embodied in software stored on a tangible computer readable medium such as a CD-ROM, a floppy disk, a hard drive, a digital versatile disk (DVD), a BluRay disk, or a memory associated with the processor 3612, but the entire program and/or parts thereof could alternatively be executed by a device other than the processor 3612 and/or embodied in firmware or dedicated hardware. Further, although the example program is described with reference to the flowchart illustrated in FIG. 35, many other methods of implementing the example controller 52, 52' and/or the sensors 48, 48a, 48b, 64 and/or 126 may alternatively be used. For example, the order of execution of the blocks may be changed, and/or some of the blocks described may be changed, eliminated, or combined.

As mentioned above, the example processes of FIG. 35 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes 3500 of FIG. 35 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

The example process 3500 of FIG. 35 is described below as being implemented by the controller 52'. In other examples, the process 3500 may be implemented using the controller 52. The controller 52, 52' and/or the sensors 48, 48a, 48b, 64 and/or 126 of the examples disclosed herein are implemented using one or more elements, processes and/or devices one or more of which may be used to perform one or more operations of the example process 3500 of FIG. 35. The example controller 52, 52' and/or the sensors 48, 48a, 48b, 64 and/or 126 and/or, more generally, the example process 3500 of FIG. 35 may be implemented by hardware, software, firmware and/or any combination of hardware, software and/or firmware. Thus, for example, the example controller 52, 52' and/or the sensors 48, 48a, 48b, 64 and/or 126 and/or, more generally, the example process 3500 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example controller 52, 52' and/or the sensors 48, 48a, 48b, 64 and/or 126 is hereby expressly defined to include a tangible computer readable medium such as a memory, DVD, CD, BluRay, etc. storing the software and/or firmware. Further still, the controller 52, 52' and/or the sensors 48, 48a, 48b, 64 and/or 126 of FIGS. 1, 2, 17, 33 and/or 34 may include one or more elements, processes and/or devices in addition to, or instead of, those illustrated in FIGS. 1, 2, 17, 33 and/or 34, and/or may include more than one of any or all of the illustrated elements, processes and devices.

Initially at FIG. 35, the controller 52' determines a position (e.g., a closed position, a not closed position) of the door 16 (block 3502). In the illustrated example, the sensor 468a provides the door position signal 56a to the controller 52' to determine the door 16 position. The controller 52' detects a location of the vehicle 22 (e.g., present, not present) (block 3504). In the illustrated example, the vehicle sensor 48b provides the vehicle position signal 56b to the controller 52'. The controller 52' determines the position of the vehicle restraint 110 (e.g., a restrain position, a release position) (block 3506). In the illustrated example, the restraint sensor 126 provides the vehicle restraint position signal 128 to the controller 52' to determine the position of the vehicle restraint 110. The controller 52' determines a position of the flexible barrier 40 (e.g., stored configuration or deployed configuration) (block 3508). In the illustrated example, the barrier sensor 64 provides the barrier position signal 66 to the controller 52' to determine the position of the flexible barrier 40.

If the controller 52' determines that the door 10 is closed (block 3510), control advances to block 3512, at which the controller 52' sends a signal to cause the solenoid actuated plunger 62 to automatically move or retract to the unlock state. If controller 52' determines that the door 10 is not in the closed position (e.g., an open position) (block 3510), the controller 52' determines if the vehicle 22 is present at the target parking spot 26 (block 3514), for example, based on the vehicle position signal 56b. If the vehicle 22 is not present at the target parking spot 26 (block 3514), control advances to block 3516.

The controller 52' determines if the flexible barrier 40 is extending across the door in the deployed configuration (block 3516), for example, based on the barrier position signal 66. If the flexible barrier 40 is in the deployed configuration (block 3516), the controller 52' sends a signal to cause the solenoid actuated plunger 62 to automatically move or extend to the lock state (block 3518). If the flexible barrier 40 is not in the deployed configuration (block 3516), the controller 52' causes the alarm 54 to emit the alarm signal 70 (block 3520).

If the vehicle 22 is present in the target parking spot 26 (block 3514), the controller 52' determines whether the vehicle restraint 110 is in the restrain position (block 3522), for example, based on the vehicle restraint position signal 128. If the vehicle restraint 110 is in the restrain position (block 3522), the controller 52' sends a signal to cause the solenoid actuated plunger 62 to automatically move or retract to the unlock state (block 3524). In some examples, if the barrier 40 is in the release position, the controller 52' prevents the vehicle restraint 110 from receiving a signal to move to the release position. In some examples, if the barrier 40 is in the deployed position, the controller 52' allows the vehicle restraint 110 to receive a signal to move to the release position. However, if the vehicle restraint 110 is not in the restrain position, control advances to block 3516. The controller 52' determines whether to continue monitoring (block 3526). For example, the controller 52' may be configured to monitor only during working hours of the respective dock door. If the controller 52' determines that it should continue monitoring (block 3526), control returns to block 3502. Otherwise, the example process 3500 of FIG. 35 ends.

Figure 36:
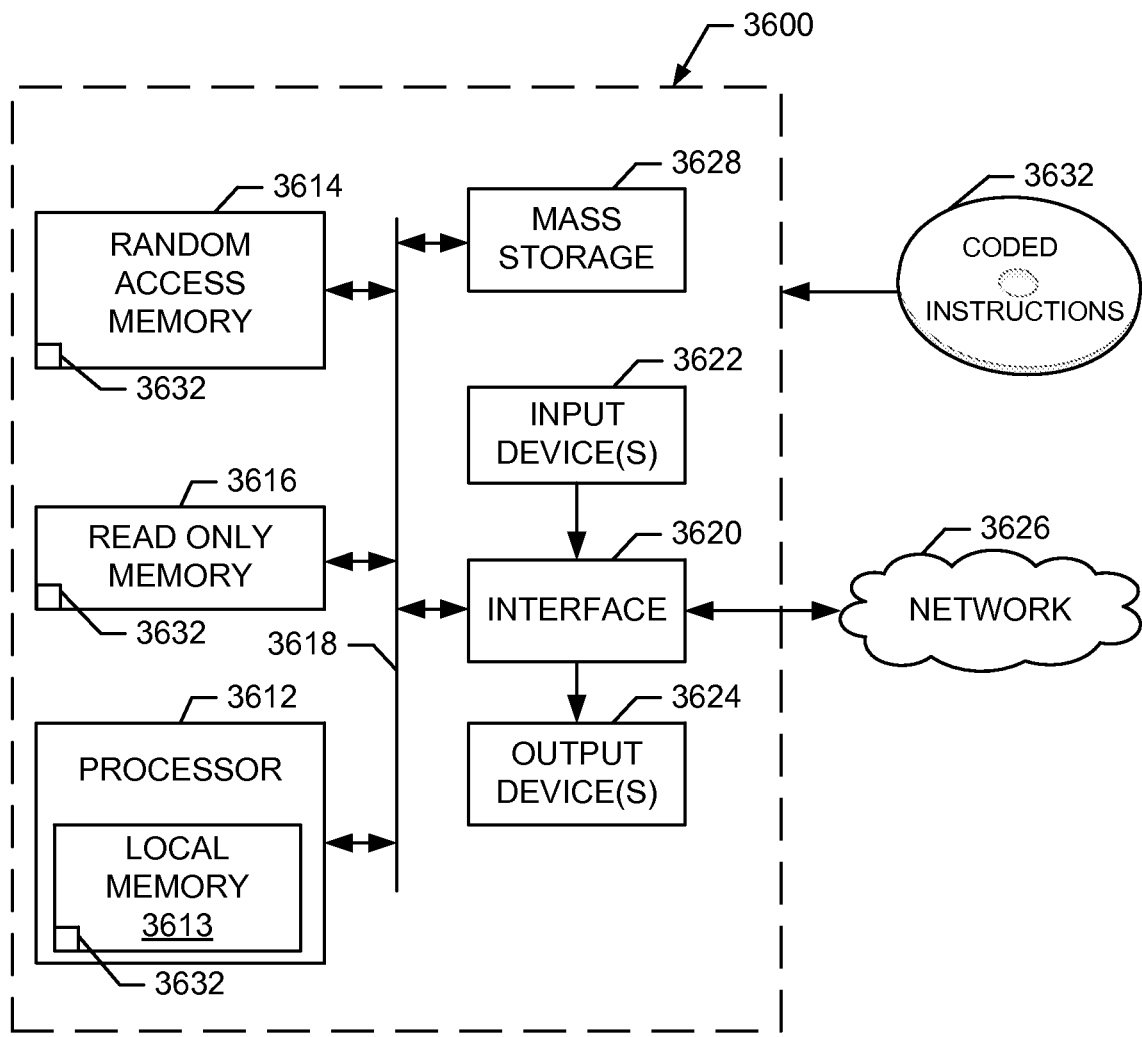
FIG. 36 is an example processor platform that may be used and/or programmed to implement any or all of the example methods and apparatus disclosed herein.

FIG. 36 is a block diagram of an example computer 3600 capable of executing the instructions of FIG. 35 to implement the examples disclosed herein. The computer 3600 can be, for example, a server, a personal computer, an industrial computer or any other type of computing device.

The system 3600 of the instant example includes a processor 3612. For example, the processor 3612 can be implemented by one or more Intel® microprocessors from the Pentium® family, the Itanium® family or the XScale® family. Of course, other processors from other families are also appropriate.

The processor 3612 is in communication with a main memory including a volatile memory 3614 and a non-volatile memory 3616 via a bus 3618. The volatile memory 3614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 3616 may be implemented by flash memory and/or any other desired type of memory device. Access to the main memory 3614, 3616 is typically controlled by a memory controller (not shown).

The computer 3600 also includes an interface circuit 3620. The interface circuit 3620 may be implemented by any type of interface standard, such as an Ethernet interface, a universal serial bus (USB), and/or a PCI express interface.

One or more input devices 3622 are connected to the interface circuit 3620. The input device(s) 3622 permit a user to enter data and commands into the processor 3612. The input device(s) can be implemented by, for example, a keyboard, a mouse, a touchscreen, a track-pad, a trackball, isopoint and/or a the sensors 48, 48a, 48b, 64 and/or 126 of FIGS. 1, 2, 17, 33 and/or 34.

One or more output devices 3624 are also connected to the interface circuit 1020. The output devices 3624 can be implemented, for example, by display devices (e.g., a liquid crystal display, light emitting diodes (LEDS) and/or available alarm devices.

The interface circuit 3620 also includes a communication device such as a modem or network interface card to facilitate exchange of data with external computers via a network 3626 (e.g., an Ethernet connection, a digital subscriber line (DSL), a telephone line, coaxial cable, a cellular telephone system, etc.).

The computer 3600 also includes one or more mass storage devices 3628 for storing software and data. Examples of such mass storage devices 3628 include floppy disk drives, hard drive disks, compact disk drives and digital versatile disk (DVD) drives. The mass storage device 3628 may implement a local storage device.

The example process 3500 of FIG. 35 may be implemented as coded instructions 3632 stored in one or more of the mass storage device 3628, in the volatile memory 3614, in the non-volatile memory 3616, and/or on a removable storage medium such as a CD or DVD.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

The invention claimed is:

1. A safety system that facilitates loading or unloading cargo of a vehicle at a loading dock, wherein the loading dock includes an elevated platform above a target parking spot, a doorway through a wall, a door at the doorway, and a path on the elevated platform leading to the doorway, the safety system comprising:
   a first support to extend above the elevated platform;
   a second support to extend above the elevated platform at a position spaced apart from the first support;
   a flexible barrier having a deployed configuration and a stored configuration, the flexible barrier having an anchored end and a distal end, the anchored end to be attached to the first support, the distal end being proximate the first support when the flexible barrier is in the stored configuration, the distal end engaging the second support when the flexible barrier is in the deployed configuration;
   a sensor to sense at least one of a location state of the vehicle and an open/closed state of the door, the sensor to provide a dock condition status signal upon sensing at least one of the location state indicating whether the vehicle is at the target parking spot or the open/closed state indicating whether the door is closed; and
   a powered latch to be coupled to the second support, the powered latch having a lock state and an unlock state, the powered latch to prevent the distal end from disengaging the second support when the flexible barrier is in the deployed configuration and the latch is in the lock state, the powered latch to permit the distal end to disengage from the second support when the flexible barrier is in the deployed configuration and the latch is in the unlock state, the powered latch to automatically switch from the lock state to the unlock state in response to the dock condition status signal indicating at least one of the door being closed or the vehicle being at the target parking spot.

2. The safety system of claim 1, wherein the powered latch is to automatically switch from the unlock state to the lock state in response to the dock condition status signal indicating at least one of the door being not closed or the vehicle being not at the target parking spot when the flexible barrier is in the deployed configuration.

3. The safety system of claim 1, further comprising a first retainer on the second support, the distal end to engage the first retainer when the flexible barrier is in the deployed configuration, the first retainer to hold the distal end proximate the second support when the flexible barrier is in the deployed configuration while the powered latch is in the unlock state.

4. The safety system of claim 3, further comprising a second retainer on the second support, the second retainer being vertically spaced apart from the first retainer, the distal end engaging both the first retainer and the second retainer when the flexible barrier is in the deployed configuration, both the first retainer and the second retainer are positioned to hold the distal end proximate the second support when the flexible barrier is in the deployed configuration while the powered latch is in the unlock state.

5. The safety system of claim 1, wherein the distal end is elongate in a lengthwise direction, the powered latch comprises a solenoid actuated plunger and an elongate member, the solenoid actuated plunger being movable between a lock position and an unlock position, the elongate member being carried by the distal end, the elongate member being movable in the lengthwise direction in response to the solenoid actuated plunger moving between the unlock position and the lock position.

6. The safety system of claim 1, wherein the distal end is elongate in a lengthwise direction, the powered latch comprises a solenoid actuated plunger movable in the lengthwise direction between a lock position and an unlock position, the solenoid actuated plunger to block the distal end from leaving the second support when the flexible barrier is in the deployed configuration while the solenoid actuated plunger is in the lock position, and the solenoid actuated plunger to permit the distal end to leave the second support when the flexible barrier is in the deployed configuration while the solenoid actuated plunger is in the unlock position.

7. The safety system of claim 1, wherein the distal end is elongate in a lengthwise direction, the powered latch comprises a solenoid actuated plunger movable between a lock position and an unlock position in a traverse direction that is angularly displaced out of parallel alignment with the lengthwise direction, the solenoid actuated plunger to block the distal end from leaving the second support when the flexible barrier is in the deployed configuration while the solenoid actuated plunger is in the lock position, and the solenoid actuated plunger to permit the distal end to leave the second support when the flexible barrier is in the deployed configuration while the solenoid actuated plunger is in the unlock position.

8. The safety system of claim 7, wherein the traverse direction is substantially perpendicular to the lengthwise direction.

9. The safety system of claim 1, wherein the first support includes a rotatable take-up about which the flexible barrier is wrapped when the flexible barrier is in the stored configuration.

10. The safety system of claim 1, wherein the first support and the second support lie at opposite sides of the path that leads to the doorway, and the flexible barrier in the deployed configuration extends over the path.

11. The safety system of claim 1, wherein, regardless of whether the door is closed and regardless of whether the vehicle is at the target parking spot, the powered latch is in the unlock state when the distal end is spaced apart from the second support.

12. The safety system of claim 1, wherein, regardless of whether the door is closed and regardless of whether the vehicle is at the target parking spot, the powered latch is movable to the unlock state when the distal end is spaced apart from the second support.

13. A safety system that facilitates loading or unloading cargo of a vehicle at a loading dock, wherein the loading dock includes an elevated platform above a target parking spot, a doorway through a wall, a door at the doorway, and a path on the elevated platform leading to the doorway, the safety system comprising:
  a first support extending above the elevated platform;
  a second support extending above the elevated platform and being spaced apart from the first support;
  a flexible barrier having a deployed configuration and a stored configuration, the flexible barrier having an anchored end and a distal end, the anchored end being attached to the first support, the distal end being proximate the first support when the flexible barrier is in the stored configuration, the distal end engaging the second support when the flexible barrier is in the deployed configuration;
  a sensor sensing at least one of a location state of the vehicle or an open/closed state of the door, the sensor providing a dock condition status signal upon sensing at least one of the location state indicating whether the vehicle is at the target parking spot or the open/closed state indicating whether the door is closed;
  an alarm at the loading dock and being in communication with the sensor, the alarm having an energized state and a de-energized state, the alarm being in the energized state when the distal end is spaced apart from the second support while the dock condition status signal indicates that both the door is open and the vehicle is not at the target parking spot, the alarm being in the de-energized state when the distal end is spaced apart from the second support while the dock condition status signal indicates that at least one of the door is closed or the vehicle is at the target parking spot, the alarm being in the de-energized state when the flexible barrier is in the deployed configuration with the distal end engaging the second support; and
  a powered latch coupled to the second support, the powered latch having a lock state and an unlock state, the powered latch in the lock state preventing the distal end from disengaging the second support when the flexible barrier is in the deployed configuration, the powered latch in the unlock state permitting the distal end to disengage from the second support when the flexible barrier is in the deployed configuration, the powered latch automatically switching from the lock state to the unlock state in response to the dock condition status signal indicating at least one of the door being closed or the vehicle being at the target parking spot.

14. The safety system of claim 13, wherein the powered latch automatically switches from the unlock state to the lock state in response to the dock condition status signal indicating at least one of the door being not closed or the vehicle being not at the target parking spot.

15. The safety system of claim 13, further comprising a first retainer on the second support, the distal end engaging the first retainer when the flexible barrier is in the deployed configuration, the first retainer holding the distal end proximate the second support when the flexible barrier is in the deployed configuration while the powered latch is in the unlock state.

16. A safety method that facilitates loading or unloading cargo of a vehicle at a loading dock, wherein the loading dock includes an elevated platform above a target parking spot, a doorway through a wall, a door at the doorway, a path on the elevated platform leading to the doorway, and a sensor instrument system, the safety method comprising:
  extending a flexible barrier from a first support to a second support such that the flexible barrier extends across the doorway;
  connecting a distal end of the flexible barrier to the second support;
  sensing a first condition comprising at least one of the following: the door is closed or the vehicle is at the target parking spot;
  sensing a second condition comprising at least one of the following: the door is not closed or the vehicle is not at the target parking spot;
  moving a latch to a lock state in response to sensing the second condition;
  moving the latch to an unlock state in response to sensing the first condition;
  in the lock state, the latch inhibiting the distal end from separating from the second support; and
  in the unlock state, the latch permitting the distal end to separate from the second support.

17. The safety method of claim 16, further comprising a retainer on the second support urging the distal end to stay connected to the second support even when the latch is in the unlock state.

18. The safety method of claim 16, wherein the latch is solenoid actuated.

19. The safety method of claim 16, further comprising wrapping at least a portion of the flexible barrier around a rotatable take-up supported by the first support.

20. The safety method of claim 16, wherein the second condition comprises both of the following: the door is not closed and the vehicle is not at the target parking spot.

21. A safety system that facilitates loading or unloading cargo of a vehicle at a loading dock, wherein the loading dock includes an elevated platform above a target parking spot, a doorway through a wall, a door at the doorway, and a vehicle restraint selectively movable between a restrain position blocking the vehicle and a release position releasing the vehicle, the safety system comprising:

a first support extending above the elevated platform;

a second support extending above the elevated platform and being spaced apart from the first support;

a flexible barrier having a deployed configuration and a stored configuration, the flexible barrier having an anchored end and a distal end, the anchored end being attached to the first support, the distal end being proximate the first support when the flexible barrier is in the stored configuration, the distal end engaging the second support when the flexible barrier is in the deployed configuration;

a sensor responsive to the vehicle restraint and providing a vehicle restraint position signal indicating whether the vehicle restraint is in the release position; and a powered latch coupled to the second support, the powered latch having a lock state and an unlock state, the powered latch in the lock state preventing the distal end from disengaging the second support when the flexible barrier is in the deployed configuration, the powered latch in the unlock state permitting the distal end to disengage from the second support when the flexible barrier is in the deployed configuration, the powered latch automatically switching from the unlock state to the lock state in response to the vehicle restraint position signal indicating that the vehicle restraint is in the release position.

22. The safety system of claim 21, further comprising a first retainer on the second support, the distal end engaging the first retainer when the flexible barrier is in the deployed configuration, the first retainer holding the distal end proximate the second support when the flexible barrier is in the deployed configuration while the powered latch is in the unlock state.

23. The safety system of claim 21, wherein the distal end is elongate in a lengthwise direction, the powered latch comprises a solenoid actuated plunger and an elongate member, the solenoid actuated plunger being movable between a lock position and an unlock position, the elongate member being carried by the distal end, the elongate member being movable in the lengthwise direction in response to the solenoid actuated plunger moving between the unlock position and the lock position.

24. The safety system of claim 21, wherein the distal end is elongate in a lengthwise direction, the powered latch comprises a solenoid actuated plunger movable in the lengthwise direction between a lock position and an unlock position, the solenoid actuated plunger blocking the distal end from leaving the second support when the flexible barrier is in the deployed configuration while the solenoid actuated plunger is in the lock position, and the solenoid actuated plunger enabling the distal end to leave the second support when the flexible barrier is in the deployed configuration while the solenoid actuated plunger is in the unlock position.

25. The safety system of claim 21, wherein the distal end is elongate in a lengthwise direction, the powered latch comprises a solenoid actuated plunger movable between a lock position and an unlock position in a traverse direction that is angularly displaced out of parallel alignment with the lengthwise direction, the solenoid actuated plunger blocking the distal end from leaving the second support when the flexible barrier is in the deployed configuration while the solenoid actuated plunger is in the lock position, and the solenoid actuated plunger enabling the distal end to leave the second support when the flexible barrier is in the deployed configuration while the solenoid actuated plunger is in the unlock position.

26. The safety system of claim 25, wherein the traverse direction is substantially perpendicular to the lengthwise direction.

27. The safety system of claim 21, wherein the first support includes a rotatable take-up about which the flexible barrier is wrapped when the flexible barrier is in the stored configuration.

28. A safety system that facilitates loading or unloading cargo of a vehicle at a loading dock, wherein the loading dock includes an elevated platform above a target parking spot, a doorway through a wall and a door at the doorway, the safety system comprising:

a first support extending above the elevated platform;

a second support extending above the elevated platform and being spaced apart from the first support;

a flexible barrier having a deployed configuration and a stored configuration, the flexible barrier having an anchored end and a distal end, the anchored end being attached to the first support, the distal end being proximate the first support when the flexible barrier is in the stored configuration, the distal end engaging the second support when the flexible barrier is in the deployed configuration;

a barrier sensor proximate the distal end when the flexible barrier is in the deployed configuration, the barrier sensor providing a barrier position signal indicating whether the barrier is not in the deployed configuration;

a vehicle restraint selectively movable between a restrain position blocking the vehicle and a release position releasing the vehicle; and a controller in communication with the vehicle restraint and the barrier sensor, the controller being connected to receive the barrier position signal from the barrier sensor, the controller selectively providing a lock signal and a release signal to the vehicle restraint, the vehicle restraint moving to the restrain position in response to receiving the lock signal, the vehicle restraint moving to the release position in response to receiving the release signal, the controller inhibiting the release signal from being conveyed to the vehicle restraint when the barrier position signal indicates that the flexible barrier is not in the deployed configuration.

29. The safety system of claim 13, further comprising a first retainer on the second support, the distal end engaging the first retainer when the flexible barrier is in the deployed configuration, the first retainer holding the distal end proximate the second support when the flexible barrier is in the deployed configuration while the powered latch is in the unlock state.

30. The safety system of claim 13, wherein the distal end is elongate in a lengthwise direction, the powered latch comprises a solenoid actuated plunger and an elongate member, the solenoid actuated plunger being movable between a lock position and an unlock position, the elongate member being carried by the distal end, the elongate member being movable in the lengthwise direction in response to the solenoid actuated plunger moving between the unlock position and the lock position.

31. The safety system of claim 13, wherein the distal end is elongate in a lengthwise direction, the powered latch comprises a solenoid actuated plunger movable in the lengthwise direction between a lock position and an unlock position, the solenoid actuated plunger blocking the distal end from leaving the second support when the flexible barrier is in the deployed configuration while the solenoid actuated plunger is in the lock position, and the solenoid actuated plunger permitting the distal end to leave the second support when the flexible barrier is in the deployed configuration while the solenoid actuated plunger is in the unlock position.

32. The safety system of claim 13, wherein the distal end is elongate in a lengthwise direction, the powered latch comprises a solenoid actuated plunger movable between a lock position and an unlock position in a traverse direction that is angularly displaced out of parallel alignment with the lengthwise direction, the solenoid actuated plunger blocking the distal end from leaving the second support when the flexible barrier is in the deployed configuration while the solenoid actuated plunger is in the lock position, and the solenoid actuated plunger permitting the distal end to leave the second support when the flexible barrier is in the deployed configuration while the solenoid actuated plunger is in the unlock position.

33. The safety system of claim 32, wherein the traverse direction is substantially perpendicular to the lengthwise direction.

34. The safety system of claim 28, wherein the first support includes a rotatable take-up about which the flexible barrier is wrapped when the flexible barrier is in the stored configuration.

* * * * *